(12) United States Patent
Wang et al.

(10) Patent No.: US 12,382,264 B2
(45) Date of Patent: Aug. 5, 2025

(54) CROSS-RESOURCE SUBSCRIPTION FOR M2M SERVICE LAYER

(71) Applicant: InterDigital Patent Holdings, Inc., Wilmington, DE (US)

(72) Inventors: Chonggang Wang, Princeton, NJ (US); Rocco Di Girolamo, Laval (CA); Hongkun Li, Malvern, PA (US); Qing Li, Princeton Junction, NJ (US); Xu Li, Plainsboro, NJ (US); Catalina Mihaela Mladin, Hatboro, PA (US)

( * ) Notice: Subject to any disclaimer, the term of this patent is extended or adjusted under 35 U.S.C. 154(b) by 46 days.

(21) Appl. No.: 18/324,418

(22) Filed: May 26, 2023

(65) Prior Publication Data

US 2023/0319534 A1     Oct. 5, 2023

Related U.S. Application Data

(63) Continuation of application No. 17/226,248, filed on Apr. 9, 2021, now Pat. No. 11,711,682, which is a continuation of application No. 15/776,272, filed as application No. PCT/US2016/061997 on Nov. 15, 2016, now Pat. No. 11,012,839.

(60) Provisional application No. 62/255,649, filed on Nov. 16, 2015.

(51) Int. Cl.
*H04L 12/28* (2006.01)
*H04W 4/50* (2018.01)
*H04W 4/70* (2018.01)
*H04W 8/18* (2009.01)
*H04W 88/16* (2009.01)

(52) U.S. Cl.
CPC .............. *H04W 4/70* (2018.02); *H04W 4/50* (2018.02); *H04W 8/183* (2013.01); *H04W 88/16* (2013.01)

(58) Field of Classification Search
CPC ......... H04W 4/70; H04W 8/183; H04W 4/50; H04L 65/51; H04L 67/12
USPC .......................................... 370/252, 329, 386
See application file for complete search history.

(56) References Cited

U.S. PATENT DOCUMENTS

| 8,705,342 B2 * | 4/2014 | Yu .......................... H04L 47/782 |
| | | 370/216 |
| 8,848,659 B2 | 9/2014 | Cubic et al. |
| 9,064,389 B1 | 6/2015 | Bernstein |

(Continued)

FOREIGN PATENT DOCUMENTS

| CN | 103593408 A | 2/2014 |
| CN | 103795689 A | 5/2014 |

(Continued)

OTHER PUBLICATIONS oneM2M Technical Specification TS-0001-V2.3.0 "Functional Architecture" Aug. 7, 2015, 352 pages.

(Continued)

*Primary Examiner* — John Pezzlo
(74) *Attorney, Agent, or Firm* — BakerHostetler

(57) ABSTRACT

A subscriber issues a message to a resource host to request subscription to multiple resources. This message may indicate identifiers of these resources, event notification criteria for each individual resource and define cross-resource notification criteria such as time window type and time window size. The resource host issues cross-resource notifications to the subscriber or its designated notification targets when expected changes on the target resources occur within a time window.

20 Claims, 23 Drawing Sheets

(56) References Cited

U.S. PATENT DOCUMENTS

| | | | |
|---|---|---|---|
| 10,142,805 B2 * | 11/2018 | Jeong | H04W 72/04 |
| 2011/0032896 A1 | 2/2011 | Cubic et al. | |
| 2012/0269053 A1 | 10/2012 | Yu et al. | |
| 2013/0304885 A1 * | 11/2013 | Acharya | H04L 67/54 709/223 |
| 2014/0226577 A1 | 8/2014 | Lee et al. | |
| 2014/0340219 A1 | 11/2014 | Russell et al. | |
| 2015/0067154 A1 * | 3/2015 | Ly | H04L 67/10 709/224 |
| 2015/0295785 A1 | 10/2015 | Fan | |
| 2016/0192111 A1 | 6/2016 | Choi et al. | |
| 2016/0234691 A1 | 8/2016 | Jeong et al. | |
| 2017/0087367 A1 | 3/2017 | Weisend | |
| 2017/0310415 A1 | 10/2017 | Thangarasa et al. | |
| 2018/0034777 A1 | 2/2018 | Jeong et al. | |
| 2018/0249301 A1 | 8/2018 | Jeong et al. | |
| 2018/0373772 A1 | 12/2018 | Kim et al. | |
| 2022/0225079 A1 | 7/2022 | Balakrishnan et al. | |

FOREIGN PATENT DOCUMENTS

| | | |
|---|---|---|
| JP | 2011-523807 A | 8/2011 |
| JP | 2018-535605 A | 11/2018 |
| WO | 2015/031750 A1 | 3/2015 |
| WO | 2015/046960 A1 | 4/2015 |
| WO | 2017/087367 A1 | 5/2017 |

OTHER PUBLICATIONS oneM2M Technical Specification TS-0007 V0.3.0, "Service Component Architecture" Jun. 2014, 105 pages.

* cited by examiner

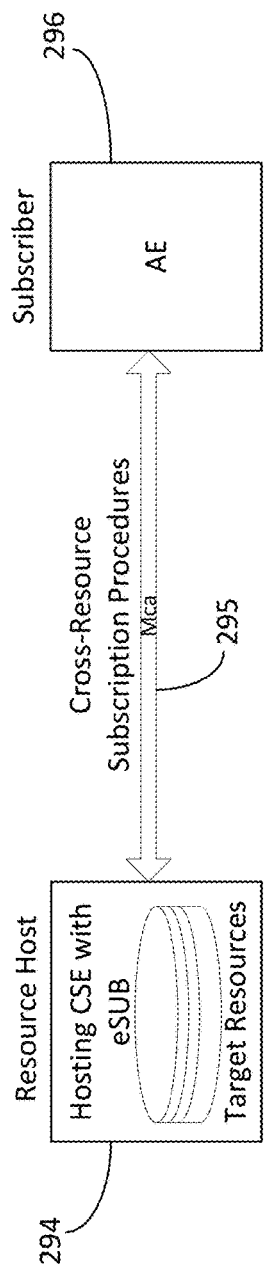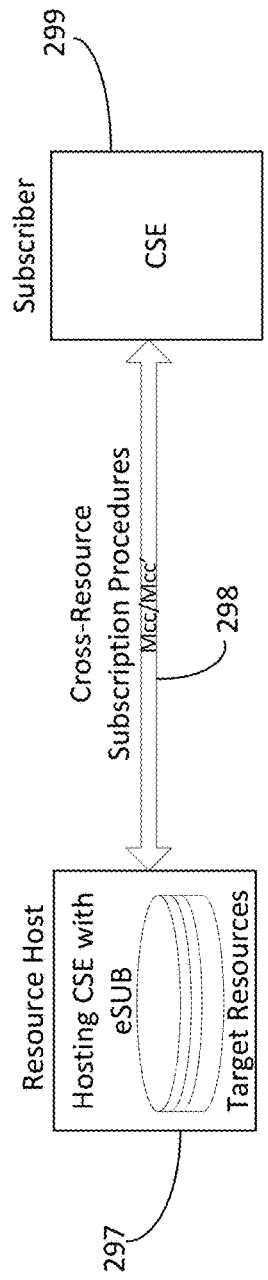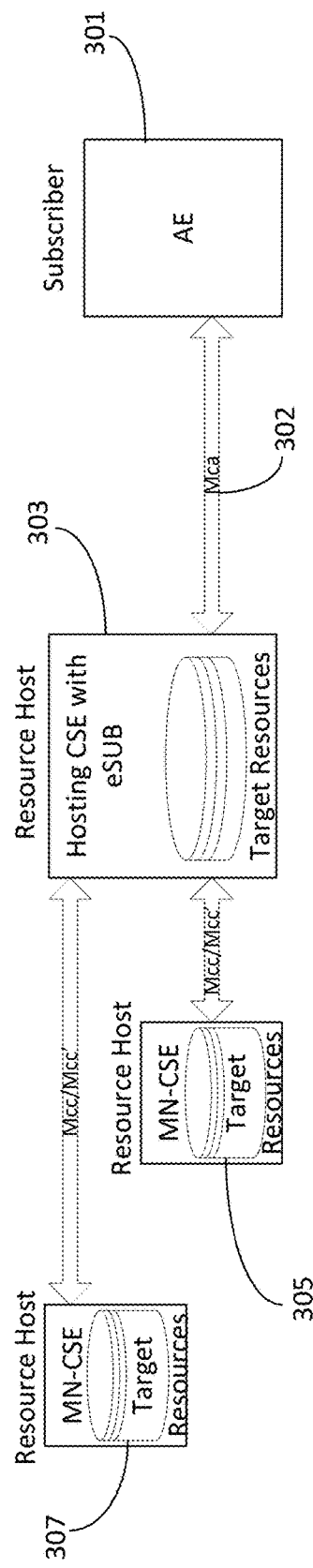
FIG. 15a
FIG. 15b
FIG. 15c

Configure/Display Parameters of Each
Cross-Resource Subscription

List of Target Resources: _____

List of Event Notification Criteria: _____

Number of Target Resources for Notification: _____

Time Window Type: _____

Time Window Size: _____

Notification Target: _____

Resource Host: _____

FIG. 18

CROSS-RESOURCE SUBSCRIPTION FOR M2M SERVICE LAYER

CROSS-REFERENCE TO RELATED APPLICATIONS

This application is a continuation of U.S. patent application Ser. No. 17/226,248 filed Apr. 9, 2021, now U.S. Pat. No. 11,711,682 issued Jul. 25, 2023, which is a continuation U.S. patent application Ser. No. 15/776,272 filed May 15, 2018, now U.S. Pat. No. 11,012,839, issued May 18, 2021, which is the National Stage Application filed under 35 U.S.C. § 371 of International Application No. PCT/US2016/061997 filed Nov. 15, 2016, which claims the benefit of U.S. Provisional Patent Application No. 62/255,649, filed Nov. 16, 2015, the disclosures of which are hereby incorporated by reference as if set forth in their entirety.

BACKGROUND

Service Layer

FIG. 1 illustrates an exemplary protocol stack supporting service layer 100. As shown in FIG. 1, from a protocol stack perspective, service layer 100 may be situated above the application protocol layer and provide value added services to applications or to another service layer. Hence service layers are often categorized as "middleware" services. For example, FIG. 1 shows an exemplary service layer between an IP network stack and applications.

An M2M service layer is an example of one type of service layer specifically targeted towards providing value-added services for M2M type devices and applications. Recently, several industry standards bodies (e.g., oneM2M-TS-0001, oneM2M Functional Architecture, V-2.3.0 (hereinafter oneM2M)) have been developing M2M service layers to address the challenges associated with the integration of M2M-type devices and M2M-type applications into deployments such as the Internet/Web, cellular, enterprise, and home network.

An M2M service layer may provide applications and devices access to a collection of M2M-oriented capabilities supported by the service layer. A few examples include security, charging, data management, device management, discovery, provisioning, and connectivity management. These capabilities are made available to applications via Application Programming Interfaces (APIs) which make use of message formats, resource structures, resource representations, and function calls as defined by the M2M service layer. For example, an M2M service layer may maintain a large amount of M2M data, which can be retrieved or subscribed to by M2M applications based on their access rights. Subscription-based data access could be more efficient than retrieval-based data access since it does not introduce a message to an M2M application until desired changes to the subscribed resource takes place.

oneM2M Service Layer Architecture oneM2M provides technical specifications which address the need for a common M2M Service Layer that can be readily embedded within various hardware and software, and which can be relied upon to connect a wide variety of devices in the field with M2M application servers worldwide.

The oneM2M common services layer supports a set of Common Service Functions (CSFs) (e.g., service capabilities), as shown in FIG. 2. An instantiation of a set of one or more particular types of CSFs is referred to as a Common Services Entity (CSE) which can be hosted on different types of network nodes (e.g., infrastructure node (IN), middle node (MN), application-service node (ASN)). CSFs provide a set of services to application entities (AEs) or other CSEs.

FIG. 3 illustrates the oneM2M functional architecture, resource oriented architecture (ROA). In ROA architecture, a resource is a uniquely addressable element in the architecture having a representation that can be manipulated via RESTful methods such as Create, Retrieve, Update, and Delete. These resources are made addressable using Uniform Resource Identifiers (URIs). A resource may contain child resource(s) and attribute(s), which also may be uniquely addressable. A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

A CSE (e.g., CSE 109) can register to another CSE (e.g., CSE 111). For example, an M2M gateway (e.g., MN-CSE/CSE 109) registers itself to an M2M server (e.g., IN-CSE/CSE 111) and the M2M server becomes the registrar CSE of the M2M gateway. Likewise, when an IN-AE registers to an IN-CSE, the IN-CSE is referred to as the registrar CSE of the IN-AE. CSE 111 may create <application> resource for registered AE 103 or AE 118.

In FIG. 3, application entity (AE) 101 and AE 118 or AE 117 and AE 103, refer to different M2M applications, which may reside in infrastructure domain 107 or field domain 105, respectively. The field domain 107 "consists of M2M Devices, M2M Gateways, Sensing and Actuation (S&A) Equipment and M2M Area Networks", while the infrastructure domain 105 "consists of Application Infrastructure and M2M Service Infrastructure" according to oneM2M-TS-0011-Definitions and Acronyms-V0.7.0. AE 101 can access and leverage CSFs in CSE 109 via Mca interface 108. In addition, CSE 109 provides a suite of CSFs and CSE 109 can communicate with another CSE 111 via Mcc interface 110. CSE 109 can also leverage network service entity (NSE) 113 from underlying networks via Mcn interface 112.

According to oneM2M Functional Architecture Baseline, oneM2M reference points include Mca 108, Mcc 110, Mcc' 114, and Mcn 112. Mca reference point 108 (also known as Mca interface) designates communication flows between an AE (e.g., AE 101) and a CSE (e.g., CSE 109). Mca reference point 108 allows AE 101 to use the services provided by CSE 109, and for CSE 109 to communicate with AE 101. Mcc reference point 110 designates communication flows between two CSEs (e.g., CSE 109 and CSE 111). Mcc reference point 110 allows CSE 109 to use the services of CSE 111 in order to provide needed functionality. The services offered via Mcc reference point 110 are dependent on the functionality supported by CSE 109 and CSE 111.

Mcc' reference point 114 designates communication flows between two CSEs in infrastructure nodes that are oneM2M compliant and that resides in different M2M SP domains. Hence, it allows CSE 111 of infrastructure node 105 residing in the Network Domain of an M2M Service Provider to communicate with a CSE of another infrastructure node (not shown) residing in the Network Domain of another M2M Service Provider 115 to use its services, and vice versa. Mcn reference point 112 designates communication flows between CSE 109 and underlying NSE 113. Mcn reference point 112 allows CSE 109 to use the services (other than transport and connectivity services) provided by the underlying NSE 113 in order to provide the needed functionality.

A few CSFs have been defined in oneM2M Functional Architecture Baseline that include the Registration (REG)

CSF, Application and Service Layer Management (ASM) CSF, Device Management (DM) CSF, Data Management and Repository (DMR) CSF, Communications and Message Delivery Handling (CMDH) CSF, Service Charging and Accounting (SCA) CSF, etc. For example, a CSE (e.g., an M2M server) provides REG CSF so that an AE can first register itself to the CSE, in order to leverage other CSFs provided by the CSE. This architecture allows multiple AEs to independently register with the same CSE. After the registration is successful, the CSE creates a separate resource (e.g., <application> resource) for each AE. Conventional oneM2M Functional Architecture Baseline lack functions to support the relationship among different applications.

oneM2M Subscription and Notification CSF

The oneM2M functional architecture defines a set of CSFs, which can be provided by a CSE such as an M2M server to other CSEs or AEs. One of the defined CSFs is Subscription and Notification (SUB) which provides notifications pertaining to a subscription that tracks changes on a resource (e.g., deletion of a resource).

The SUB CSF manages subscriptions to resources, subject to access control policies (ACPs), and sends corresponding notifications to the address(es) where the resource subscribers want to receive them. According to oneM2M, ACPs shall be used by the CSE to control access to the resources as specified in oneM2M ROA architecture. The ACP is designed to fit different access control models such as access control lists, role based access control, or attribute based access control. The <accessControlPolicy> resource is specified to support various ACPs, which includes privileges and selfPrivileges attributes, which represent a set of access control rules defining which M2M entities have the privilege to perform certain operations within specified contexts and are used by the CSEs in making access decision to specific resources. An AE or a CSE is the subscription resource subscriber. AEs and CSEs subscribe to resources of other CSEs. A subscription Hosting CSE sends notifications to the address(es) specified by the resource subscriber when modifications to a resource are made. The scope of a resource subscription includes tracking changes and operations of attribute(s) and direct child resource(s) of the subscribed-to resource. It does not include tracking the change of attribute(s) of the child resource(s). Each subscription may include notification criteria that specify which, when, and how notifications are sent. These notification criteria may work in conjunction with oneM2M's Communication Management and Delivery Handling (CMDH) policies.

A subscription is represented as resource <subscription> in the CSE resource structure.

The functions supported by the SUB CSF are as follows:
Inclusion of the resource subscriber ID, the hosting CSE-ID and subscribed-to resource address(es) per resource subscription request. It may also include other criteria (e.g., resource modifications of interest and notification policy) and the address(es) where to send the notifications.
Ability to subscribe to a single resource via a single subscription, or subscribe to multiple resources via a single subscription when they are grouped and represented as a single group resource. When a subscriber makes subscription to a group of resources, the same event notification criteria are used for all resources in the group; in turn, the hosting CSE may generate notification whenever changes to an individual (not all) resource take place.

In oneM2M, subscribers could be AE(s) or CSE(s), while hosting node(s) or transit node(s) have to be CSE(s). For example, an IN-AE as a subscriber could make subscription to resources hosted by an IN-CSE (i.e., hosting node). In another example, an MN-CSE has some resources in which an IN-AE as a subscriber wants to subscribe; but the IN-AE's subscription request must go through its IN-CSE (i.e. transit node) to reach the MN-CSE.

FIG. 4 illustrates an example procedure according to oneM2M specification, where a subscriber 132 (e.g., IN-AE) makes a subscription to a resource on a hosting CSE 131 (e.g., an IN-CSE/<subscribed-to-resource>). To do that, at step 134, subscriber 132 issues a CREATE request to create a <subscription> resource under <subscribed-to-resource>. Subscriber 132 may indicate eventNotificationCriteria and multiple notificationURIs at step 134. The eventNotificationCriteria shows which events about <subscribed-to-resource> subscriber 132 is interested. The notification can be sent to subscriber 132 or the notification target as indicated by notificationURI (e.g., notificationURI1 for subscriber 132 and notificationURI2 for notification target 133, another notification target in this example). At step 135, hosting CSE 131, as a hosting CSE, initially creates a <subscription> as sub-resource of <subscribed-to-resource> after receiving the subscription request at step 134. At step 136, hosting CSE 131 may provide a subscription response, which may indicate success or failure of subscription request of step 134. At step 137, an event occurs that meets eventNotificationCriteria (e.g., criteria provided in step 134). Subsequently, when an event occurs and meets eventNotificationCriteria, hosting CSE 131 at step 138 and 139 automatically sends two notifications, respectively to subscriber 132 and notification target 133 indicated by a respective notificationURI. Notification target 133 may be the subscriber itself if the notificationURI in step 134 contains its URI. In addition, the subscription request of step 134 may contain multiple notificationURIs, which means subscriber 132 is requesting future notifications to be sent to multiple notification targets. In such a case, the eventNotificationCriteria is the same and applies to all notificationURIs. Although not shown in FIG. 4, oneM2M supports that hosting CSE 131 performing batch notifications when pendingNotification (sendAllPending) is used. Hosting CSE 131 may send multiple notifications to the same notificationURI in one message.

SUMMARY

In M2M/IoT domain, subscription provides a mechanism for a subscriber to receive automatic notifications of changes on resources. Conventional M2M service layer (e.g., oneM2M) supports subscription to a single resource for each request primitive (referred to as single-resource subscription). However, there is no support for generating notifications when changes occur to multiple resources of interest (referred to as cross-resource subscription). It can be more efficient to support subscription to multiple resources (e.g., the targeted resources) in a single request. To tackle this problem, this disclosure discloses mechanisms to support cross-resource subscription.

In an example, a subscriber issues a message to a resource host to request subscription to multiple resources. The resource host has all these resources maintained locally. This message may indicate identifiers of these resources, event notification criteria for each individual resource and define cross-resource notification criteria such as time window type and time window size. The resource host issues cross-resource notifications to the subscriber or its designated notification targets when expected changes on the target resources occur within a time window.

In another example, a subscriber may issue a message to a first resource host to request subscription on multiple resources. The first resource host may not have all these resources which may be maintained in a second resource host, a third resource host, and so on. The first resource host my contact other resource hosts to subscribe to each single resource (a targeted resource). The first resource host can receive separate notifications from other resource hosts and generate cross-resource notification and sends it to the subscriber. New resources and attributes for implementing the proposed cross-resource subscription solution including time window mechanisms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 15A illustrates an exemplary cross-resource subscription in oneM2M;

FIG. 15B illustrates an exemplary cross-resource subscription in oneM2M;

FIG. 15C illustrates an exemplary cross-resource subscription in oneM2M;

FIG. 18 illustrates an exemplary user interface for a subscriber (e.g., an oneM2M AE);

DETAILED DESCRIPTION

In conventional oneM2M architecture, a subscriber can only make subscription to a single resource and receive automatic notifications once there is an expected change to that single resource (also known herein as "single-resource subscription" or "single-resource notification"). Disclosed herein is cross-resource subscription and cross-resource notification (used interchangeably at times), where a subscriber makes a subscription to multiple resources and notification conditions are based on dependencies on multiple resources (referred herein as "target resources"). An example of target resources as defined in oneM2M is <container> resource. A subscriber receives notifications based on matched criteria associated with the target resources.

Figure 1:
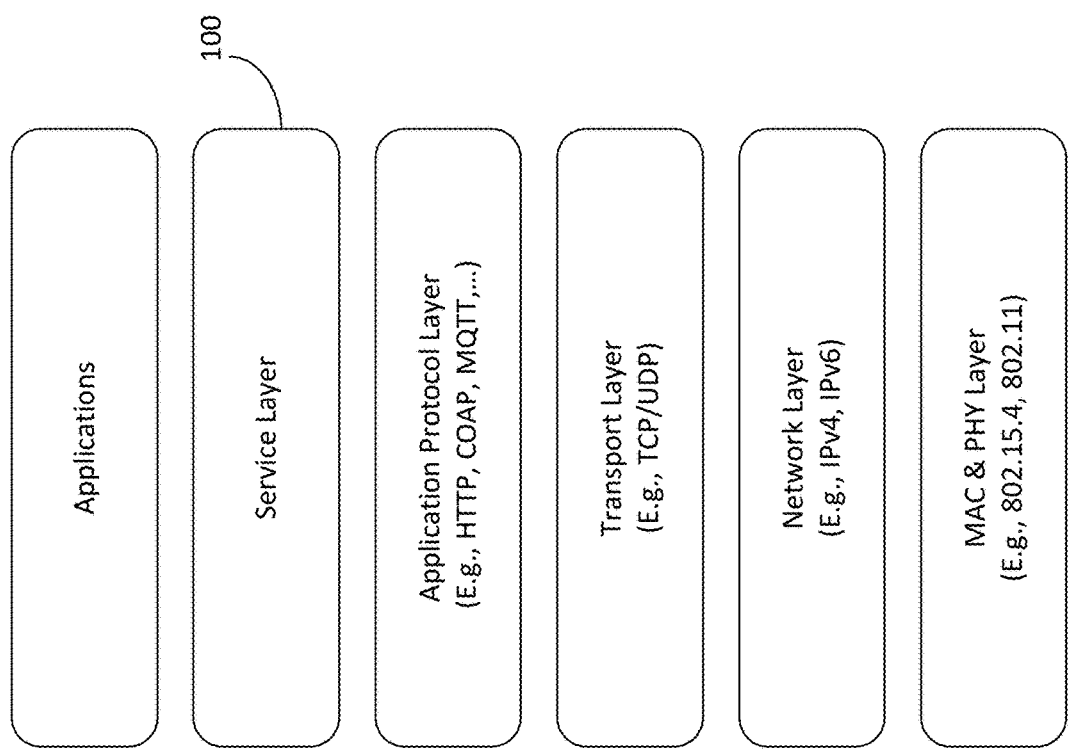
FIG. 1 illustrates an exemplary protocol stack supporting a service layer.
Figure 2:
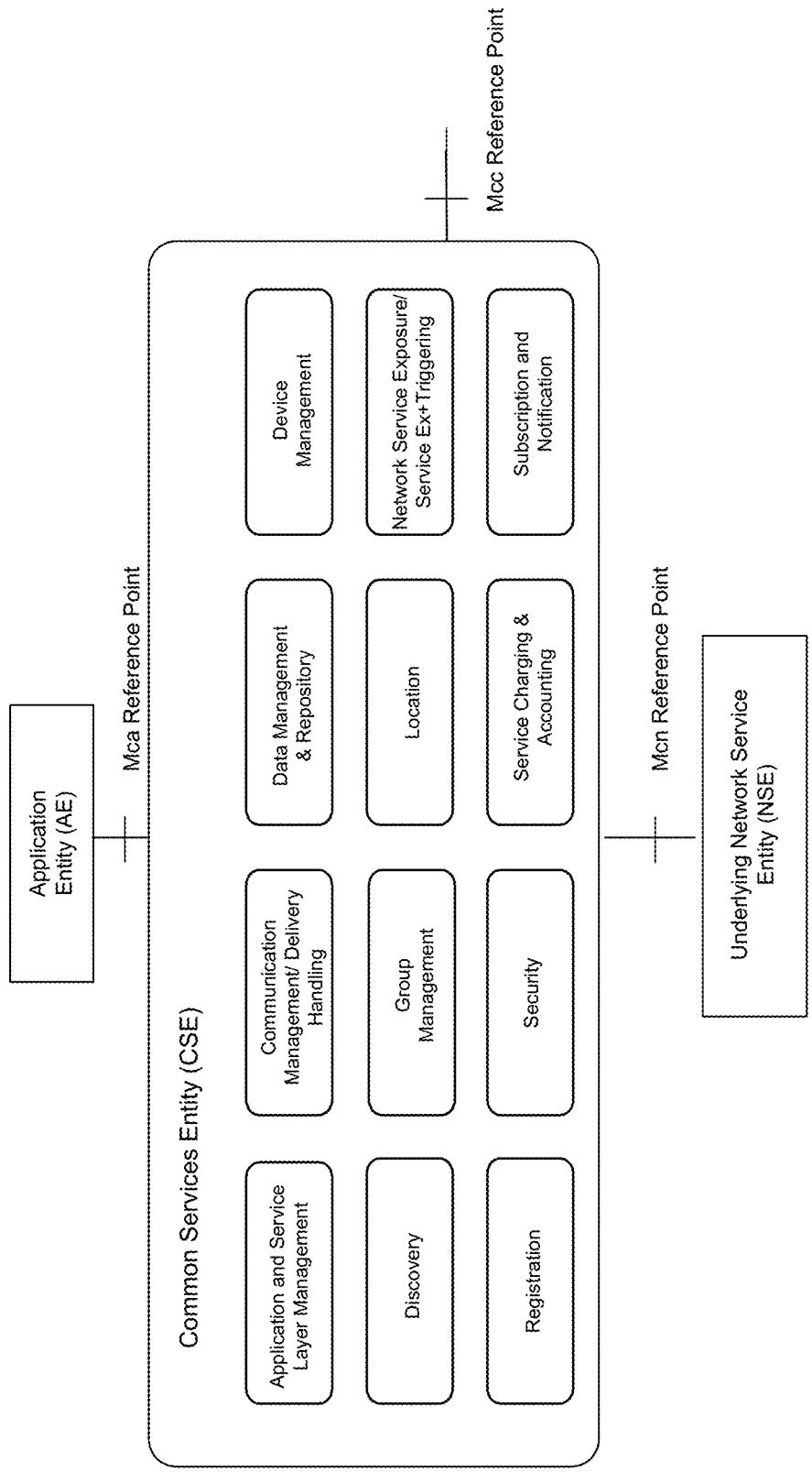
FIG. 2 illustrates an exemplary common service entity (CSE) and common service functions (CSF)
Figure 3:
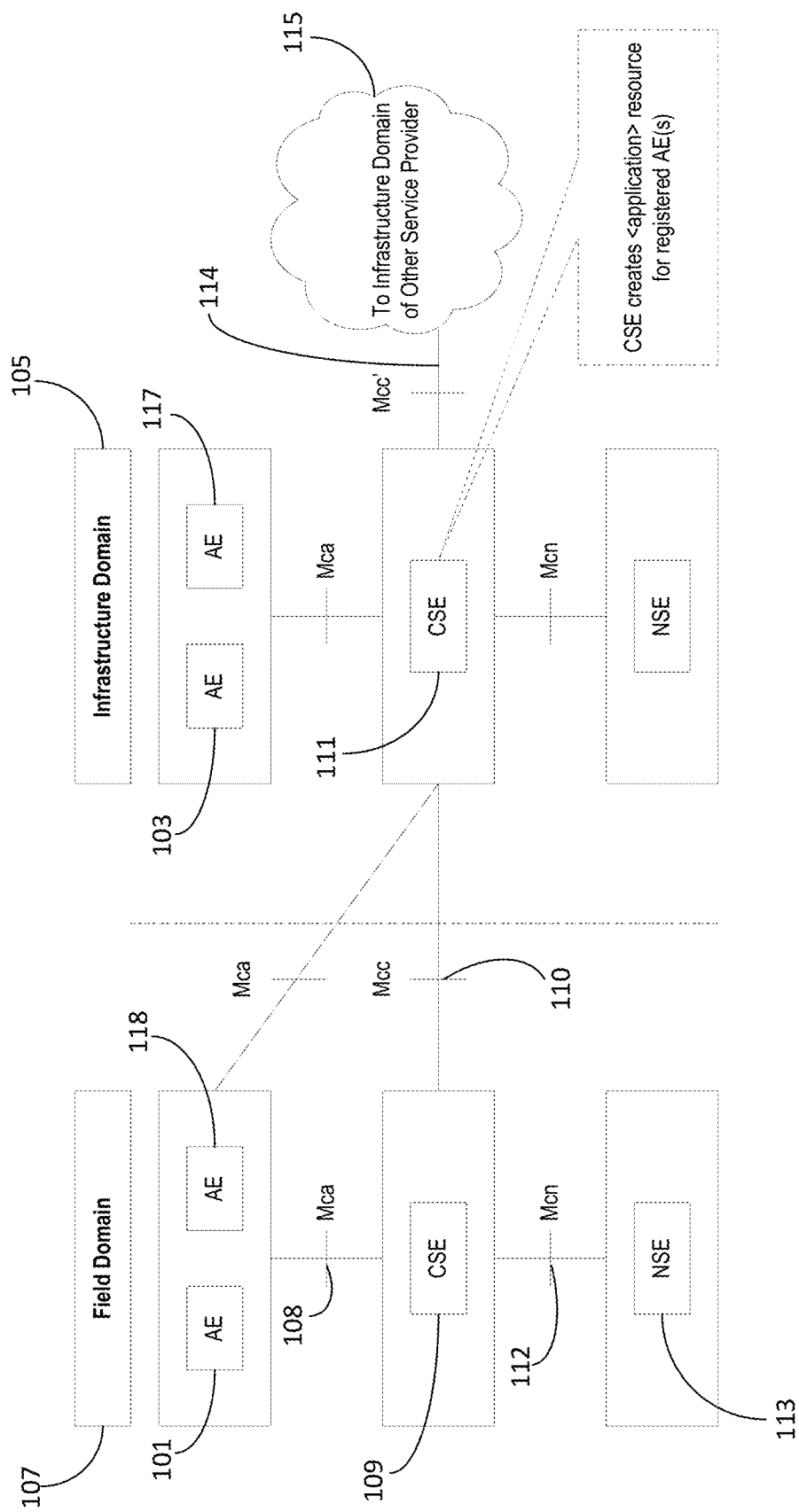
FIG. 3 illustrates an exemplary oneM2M service layer functional architecture (ROA)
Figure 4:
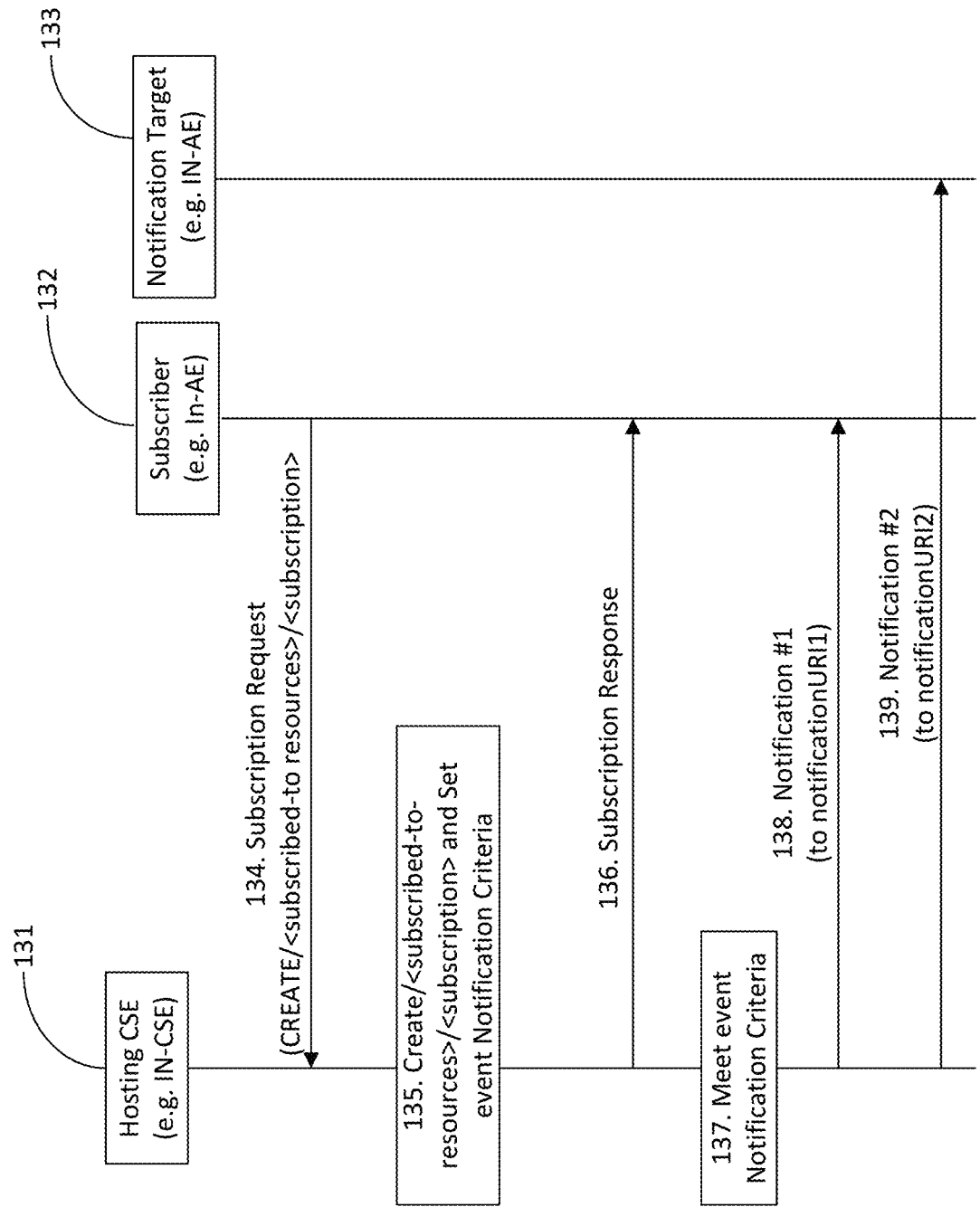
FIG. 4 illustrates an exemplary oneM2M general subscription and notification procedure.
Figure 5:
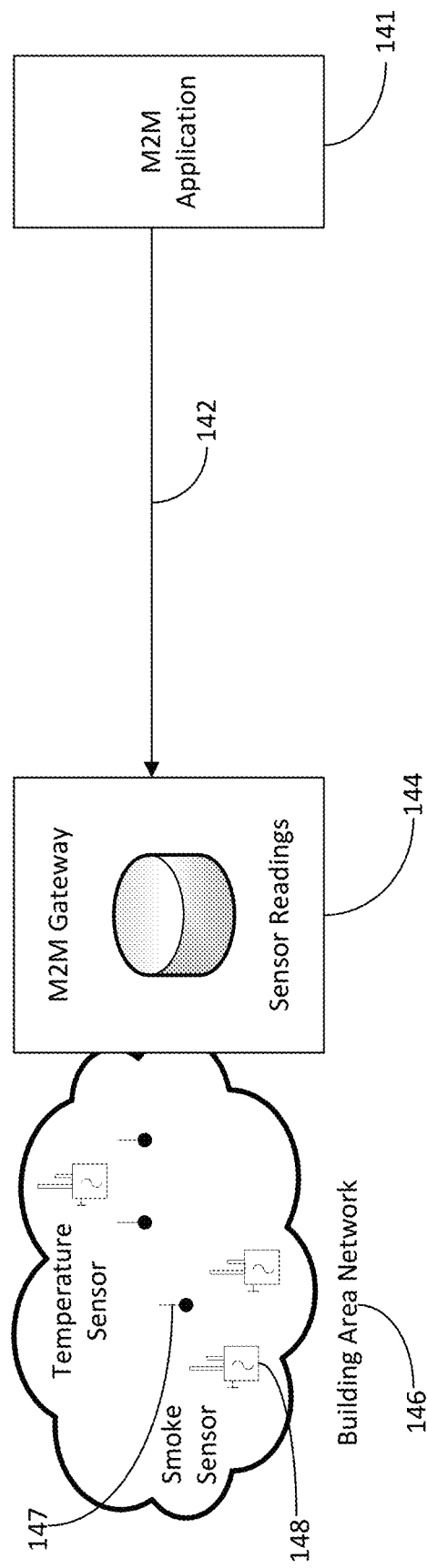
FIG. 5 illustrates an exemplary smart building scenario.

FIG. 5 illustrates a smart building scenario where various types of sensors are deployed for monitoring building environment information such as temperature (e.g., temperature sensor 147) and smoke (e.g., smoke sensor 148). Readings from these sensors may be stored at local M2M Gateway 144. M2M application 141, which may be on a desktop computer or a smart phone, is not necessarily interested in every individual sensor reading, but wants to receive automatic notifications when "temperature is higher than 25° C." AND "smoke is detected." This is an example of cross-resource subscription in this disclosure. Cross-resource subscription may be considered a subscription where automatic notification depends on two or more resources, not just a single resource. In other words, notifications are generated when changes to multiple resources occur. In this example, the automatic notification depends on two resources (e.g., temperature reading and smoke reading—each a target resource), not a single resource, and is referred to as cross-resource notification. In another example (not shown in FIG. 5), a subscriber (e.g., M2M application 141) may subscribe to get a notification when 1) retrieve operation is performed on a first resource and 2) a Delete operation is performed on a second resource at approximately the same time.

Figure 6:
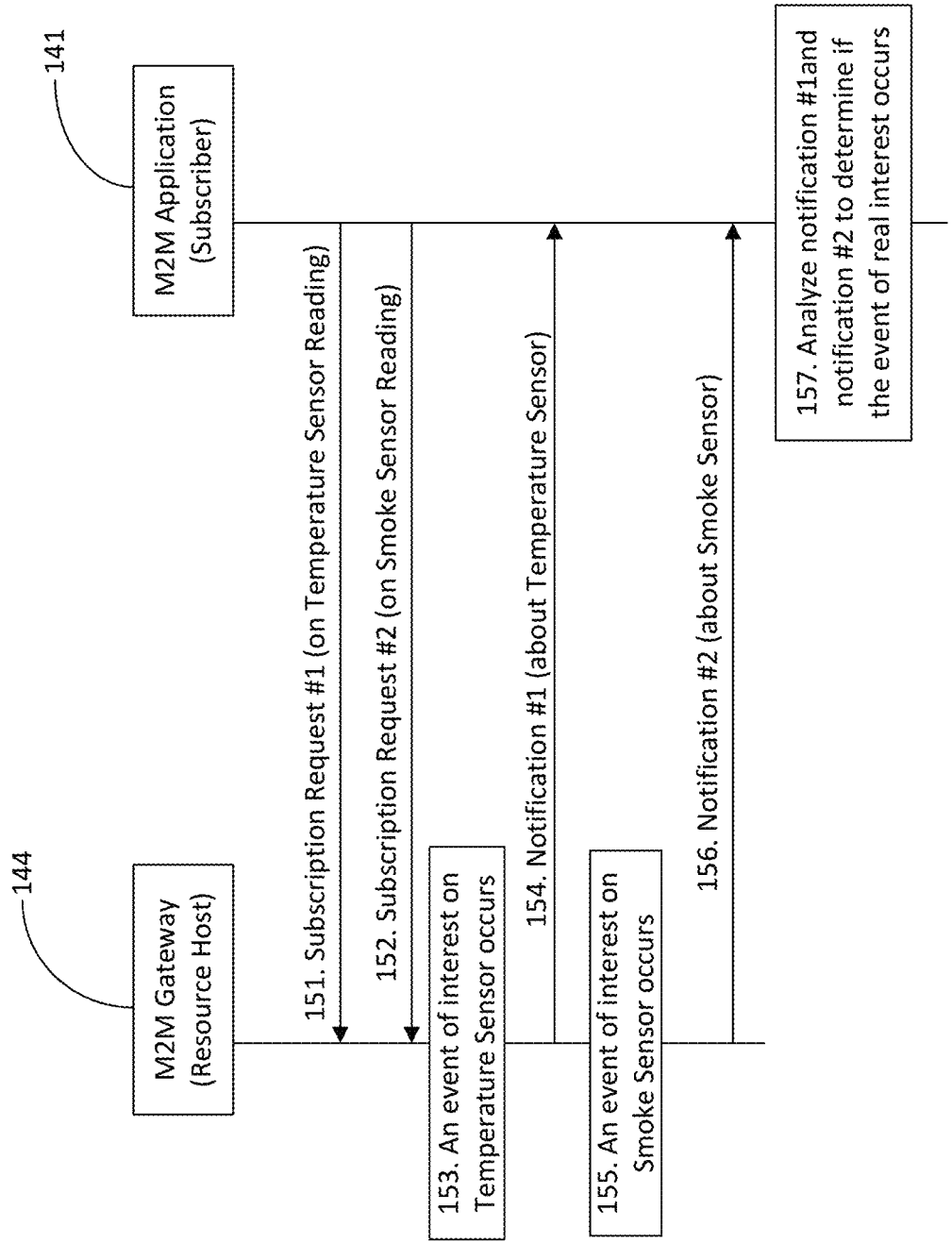
FIG. 6 illustrates an exemplary oneM2M subscription mechanism.

As described in reference to FIG. 5, readings from sensors may be stored at local M2M gateway 144, which may be referred to as a resource host. M2M Application 141, as a subscriber, makes subscriptions to the resources at M2M Gateway 144. Since existing oneM2M resource subscription mechanisms in oneM2M only support subscription to a single resource or a group of resources with the same event notification criteria (e.g., notifying after multiple temperatures sensors indicate a temperature of 90 degrees Fahrenheit), M2M application 141, conventionally, needs to make two separate subscriptions to M2M gateway 144 (see FIG. 6). FIG. 6 illustrates an exemplary conventional oneM2M subscription mechanism that may attempt to implement the use case of FIG. 5. At step 151, M2M gateway 144 receives a subscription request with regard to a temperature sensor reading (e.g., "temperature higher than 25° C."). At step 152, M2M gateway 144 receives another subscription request with regard to a smoke sensor reading (e.g., "smoke is detected"). At step 153, M2M gateway 144 determines an event of interest on a temperature sensor occurs and at step 154, subsequently, sends a notification to M2M application 141 with regard to the event. At step 155, M2M gateway 144 determines an event of interest on a smoke sensor occurs and at step 156, subsequently, sends a notification to M2M application 141 with regard to the event. At step 157, M2M application 141 analyzes the notification of step 154 and the notification of step 156 to determine if the event of interest occurs ("temperature is higher than 25° C." AND "smoke is detected."). Use of the conventional oneM2M system, introduces extra notifications (e.g., step 154 and step 156) and overhead (e.g., more processing) at M2M application 141. M2M application 141 will receive separate notifications from M2M Gateway whenever the temperature sensor or smoke sensor has a change; it then relies on its own intelligence to determine if the expected event occurred. With regard to conventional group subscription, it should be understood that oneM2M only supports subscription with the same event notification criteria to all group members and as such it cannot support this use case. For example <group> resource can be created at M2M Gateway 144 with two members (e.g., temperature sensor and smoke sensor), but M2M Application cannot create a <group>/<subscription> resource (in other words a subscription mechanism for a group) to realize the use case as discussed herein (e.g., "temperature is higher than 25° C." AND "smoke is detected.") because it must be of the same type (e.g., a first temperature sensor and a second temperature sensor is higher than 25° C.). Conventionally, M2M Application 141 cannot indicate different event notification criteria for each member resource and cannot indicate how cross-resource notifications would be generated based on existing oneM2M group subscription.

Below is a discussion of multiple issues with regard to conventional oneM2M subscriptions. Attempts to implement cross-resource subscriptions and notifications (as discussed herein), may introduce extra subscription request messages from the subscriber to the resource host. Attempts may also introduce extra notification messages from a resource host to a subscriber. A resource host, using conventional oneM2M, has no ability to determine cross-resource notification. Extra processing and overhead are needed at the subscriber. In other words, the subscriber first needs to maintain the logic about relationship and dependences among individual subscriptions. Then it needs to analyze each received individual notification to determine if the event of real interest occurs. Lastly, if an individual notification gets lost during transmission, a subscriber may not be able to know the event of interest has happened in the resource host. If a lost transmission is re-transmitted, the retransmitted message(s) may add significantly more messages to the communication channel when compared to the cross-resource subscriptions and notifications as discussed herein.

Disclosed herein with regard to cross-resource subscription and cross-resource notification, a subscriber may subscribe to multiple resources. Notification conditions are based on dependencies on multiple resources (referred to as target resources) and received notifications are based on expected changes on target resources.

Note that a subscriber is generally assumed to be a notification target, but may not be. If the subscriber is not the notification target, the described procedures herein would be similar, except that the notifications would be issued from a resource host to a specific notification target instead of the subscriber.

Discussed below are procedures for basic cross-resource subscription. For basic cross-resource subscription, a subscriber issues a single message to a resource host to request subscription on multiple target resources. The resource host maintains these target resources locally. The resource host issues cross-resource notifications to the subscriber (or the designated notification targets) when criteria are met for target resources within a time window.

Figure 20A:
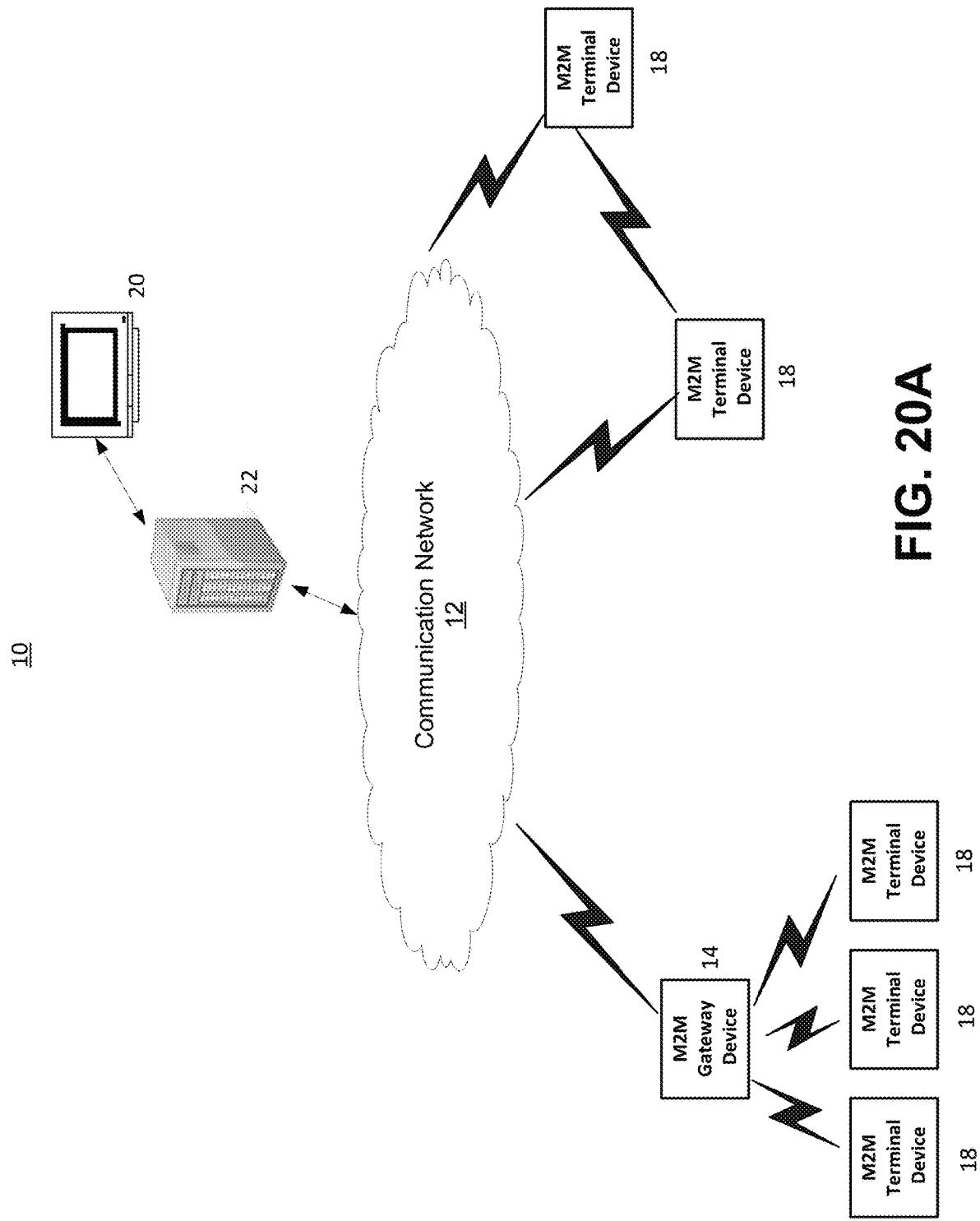
FIG. 20A is a system diagram of an example machine-to-machine (M2M) or Internet of Things (IoT) communication system in which the disclosed subject matter may be implemented.
Figure 20B:
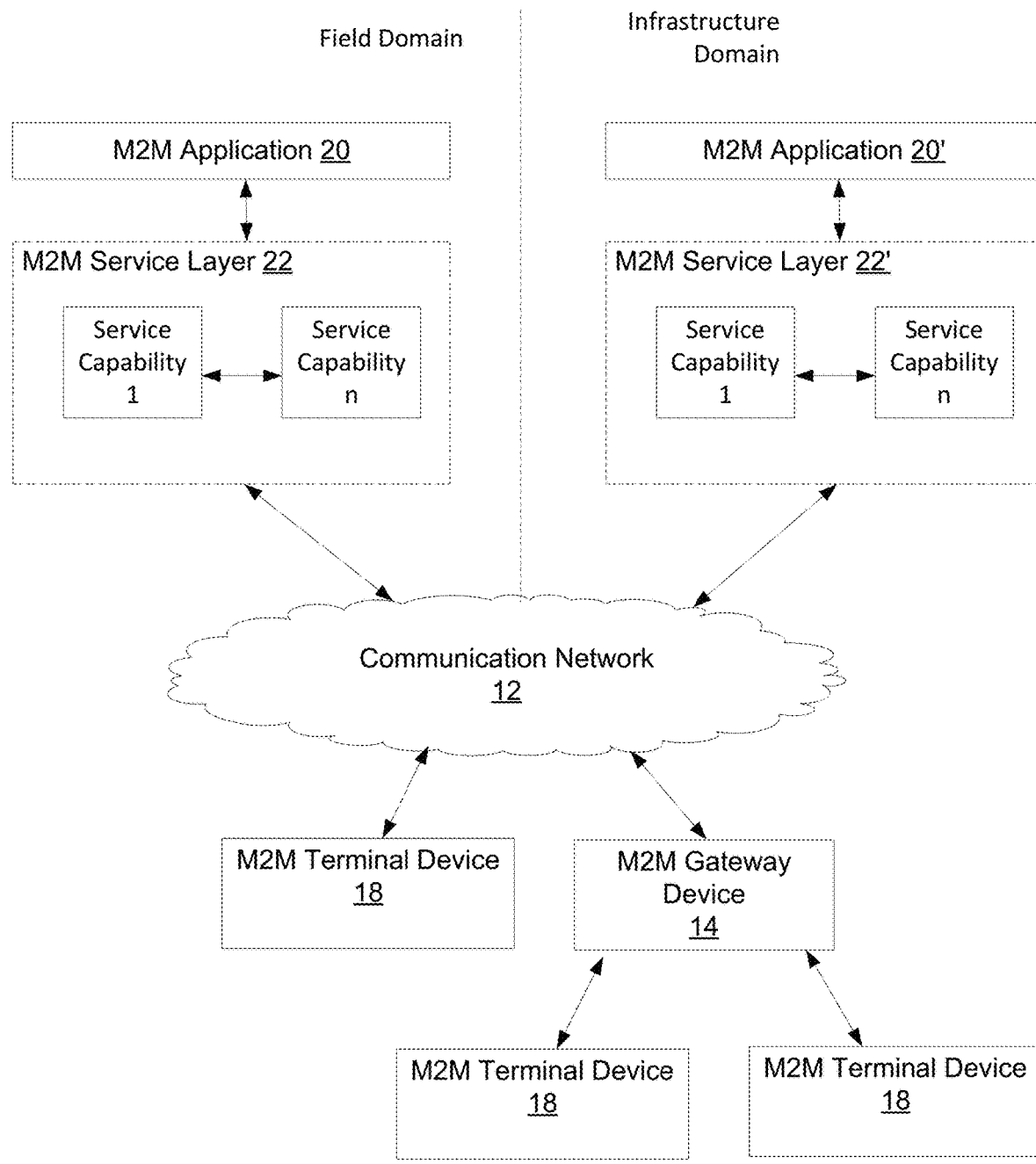
FIG. 20B is a system diagram of an example architecture that may be used within the M2M/IoT communications system illustrated in FIG. 20A.
Figure 20C:
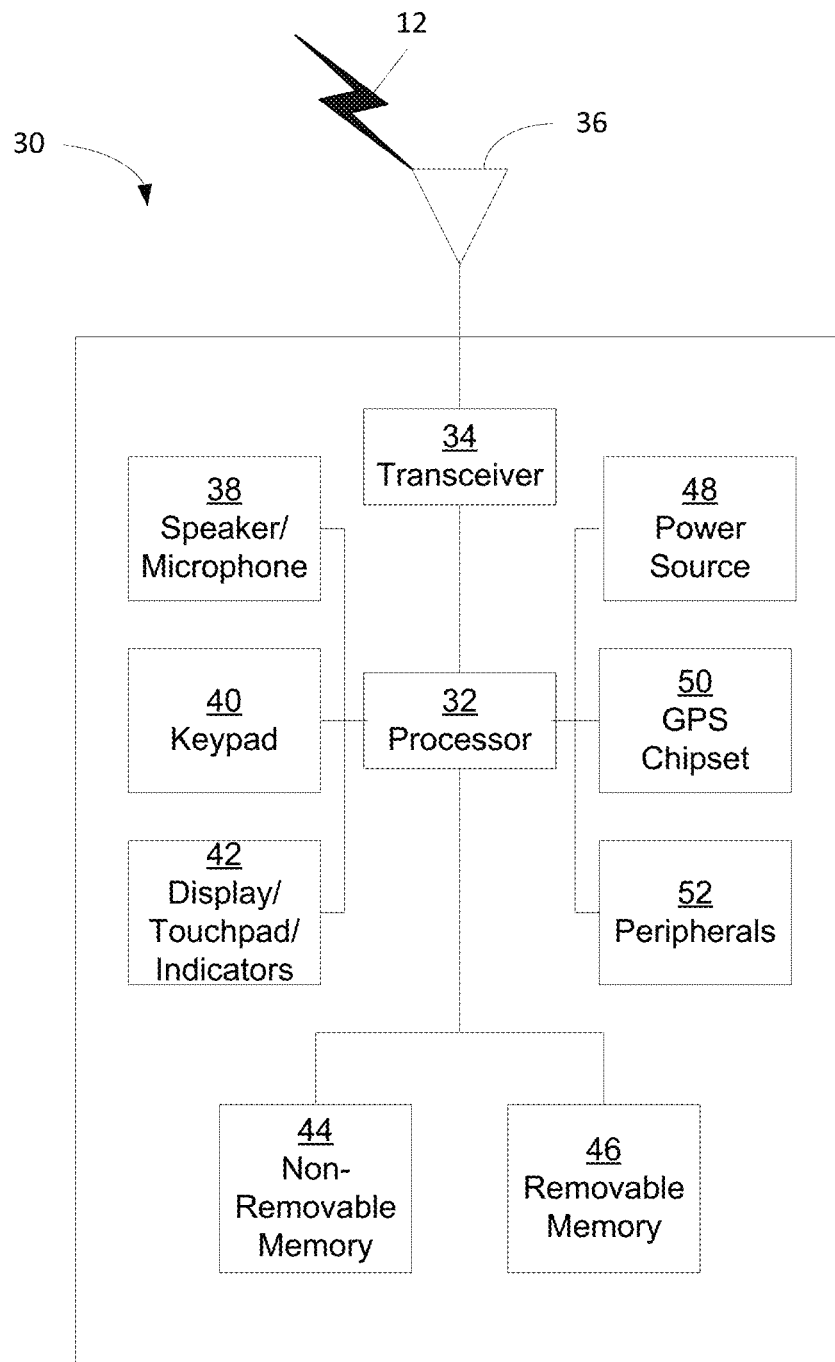
FIG. 20C is a system diagram of an example M2M/IoT terminal or gateway device that may be used within the communications system illustrated in FIG. 20A.
Figure 20D:
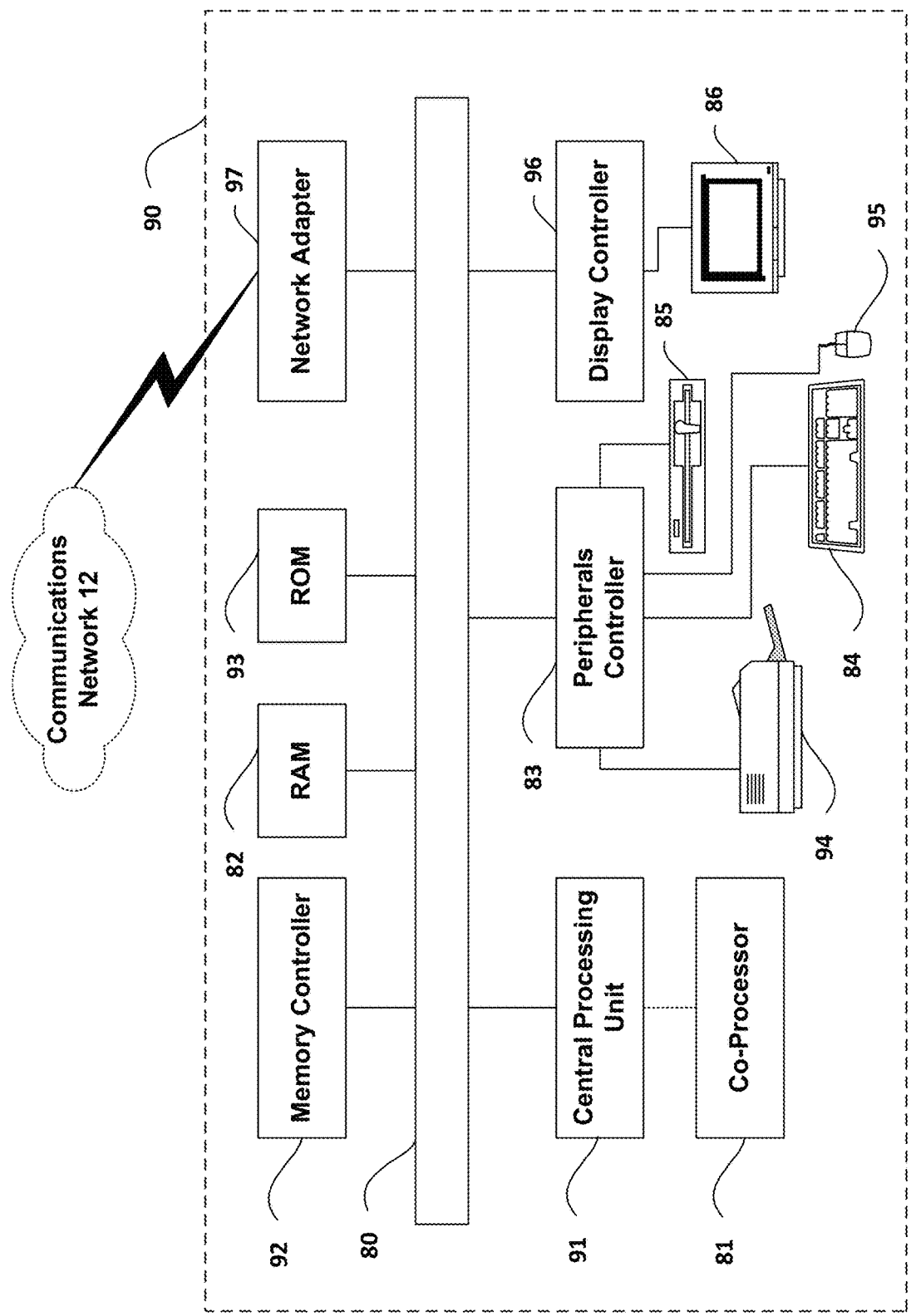
FIG. 20D is a block diagram of an example computing system in which aspects of the communication system of FIG. 20A may be embodied.

It is understood that the entities performing the steps illustrated in FIG. 7-FIG. 12 are example logical entities that may be implemented in the form of software (e.g., computer-executable instructions) stored in a memory of, and executing on a processor of, a device, server, or computer system such as those illustrated in FIG. 20C or FIG. 20D. That is, the method(s) illustrated in FIG. 7-FIG. 12 may be implemented in the form of software (e.g., computer-executable instructions) stored in a memory of a computing device, such as the device or computer system illustrated in FIG. 20C or FIG. 20D, which computer executable instructions, when executed by a processor of the computing device, perform the steps illustrated in FIG. 7-FIG. 12. In an example, with further detail below with regard to the interaction of M2M devices, AE 741 of FIG. 35 may reside on M2M terminal device 18 of FIG. 20A, while CSE 732 and Sscl 742 of FIG. 35 may reside on M2M gateway device 14 of FIG. 20A.

Figure 7:
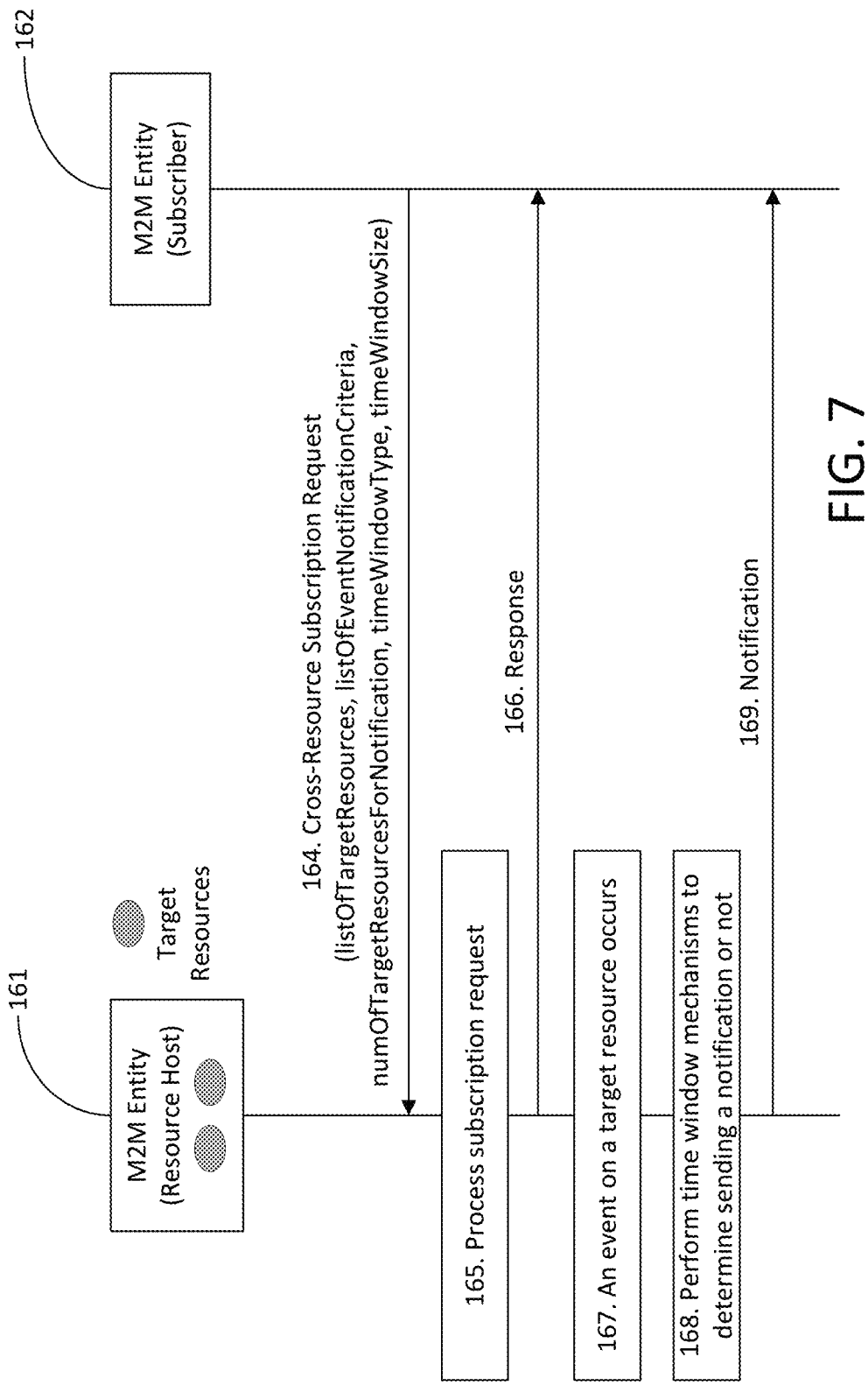
FIG. 7 illustrates an exemplary basic cross-resource subscription.

FIG. 7 illustrates an exemplary flow for a basic cross-resource subscription. M2M entity 161 is a resource host (e.g., an oneM2M IN-CSE) and M2M entity 162 is the subscriber (e.g., an oneM2M IN-AE). At step 164, M2M entity 162 sends a request message to M2M Entity 161. This request message is for cross-resource subscription, which informs M2M entity 161 that M2M entity 162 is interested in changes of multiple resources (e.g., target resources) and expects to receive a single notification when the criteria is met. The following parameters may be included in the message of step 164: listOfTargetResources, listOfEventNotificationCriteria, numOfTargetResourcesForNotification, timeWindowType, and timeWindowSize. The listOfTargetResources is the list of multiple target resources that M2M entity 162 is interested in (e.g., identifiers of target resources). See the example in Table 1. The listOfEventNotificationCriteria is the list of event notification criteria for the target resources. One event notification criteria applies to each resource in listOfTargetResources. Each event notification criteria is similar to eventNotificationCriteria as defined in oneM2M. If all target resources have the same event notification criteria, this parameter contains only one event notification criteria that apply to all target resources. The numOfTargetResourcesForNotification is the number of target resources which M2M entity 162 expects to receive notifications if the criteria are met (e.g., changes on the target resources happen). By default, the value of this parameter is equal to the number of target resources included in listOfTargetResources. In this case, the notification is generated by M2M entity 161 when changes on target resources occur and meet the criteria. The value of numOfTargetResourcesForNotification can be smaller than the number of target resources included in listOfTargetResources. In this case, M2M entity 162 may generate notifications when changes on target resources occur and meet the criteria. The timeWindowType indicates the type of time window (e.g., periodic time window or sliding time window) which M2M entity 161 may use to determine cross-resource notifications. The timeWindowSize is a time window duration which alerts M2M entity 161 to send a notification to M2M entity 162 when changes on target resources occur and meet the criteria during this time window. The timeWindowType and timeWindowSize are discussed in more detail herein.

TABLE 1

Example Parameters

| Parameter Name | Example Value |
| --- | --- |
| listOfTargetResources | Identifiers of two target resources (e.g., <temperatureContainer> and <smokeContainer>) |
| listOfEventNotificationCriteria | Value in <temperatureContainer> exceeds 80F and value in <smokeContainer> represents an event of smoke detection. |
| numOfTargetResourcesForNotification | 2 (i.e., 2 target resources) |
| timeWindowType, | Periodic Time Window |
| timeWindowSize | 2 minutes |

With continued reference to step 164, it is contemplated that if M2M entity 162 has previously established individual subscriptions with M2M entity 161, M2M entity 162 may include URI of the previously established individual subscriptions in step 164 to request cross-resource subscription. In addition, the mapping of listOfEventNotificationCriteria to listOfTargetResources described above with regard to step 164 has other mapping options, such as replace listOfEventNotificationCriteria and listOfTargetResources with a list of (targetResource, eventNotificationCriteria) tuples. Also, another example may be to replace listOfEventNotificationCriteria and listOfTargetResources with a list of target resources assigned to a single event notification criteria, for example: (targetResource1, targetResource2, targetResource3, eventNotificationCriteria1), (targetResource4, targetResource5, eventNotificationCriteria2), and so on.

At step 165, M2M entity 161 processes the cross-resource subscription request message of step 164. M2M entity 161 may reject the received cross-resource subscription request message, if M2M entity 162 does not have access rights to target resources (e.g., listOfTargetResources in its entirety). If the request is approved, M2M entity 161 may create a record of listOfTargetResources, listOfEventNotificationCriteria, numOfTargetResourcesForNotification, and timeWindow for M2M entity 162. In other words, each cross-resource subscription request from M2M entity 162, which is approved by M2M entity 161, M2M entity 161 creates a local subscription resource to maintain this approved cross-resource request. The details about such resource structure are discussed later in the context of oneM2M.

At step 166, M2M entity 161 sends a response to M2M entity 162. The response may include a Uniform Resource Identifier (URI) of the local subscription resource created in step 165, as well as an indication of the success of the request message of step 164. At step 167, M2M entity 161 observes that events on target resources take place. At step 168, M2M entity 161 performs time window algorithms to determine whether it needs to send a notification to M2M entity 162 or not. As mentioned with regard to step 164, if changes to all or some target resources (the number is specified by the parameter numOfTargetResourcesForNotification) happen within the designed time window by the parameter timeWindowSize, a notification will be generated. Such time window mechanism implemented in M2M entity 161 as a resource host enables the intelligence of cross-resource subscription, which otherwise may be imposed on the subscriber (e.g., M2M entity 162) if the single-resource subscription was used.

With continued reference to step 168 of FIG. 7, it is disclosed that the notification may be generated only if criteria are met on the number of target resources (denoted by numOfTargetResourceForNotification). This may be considered a logic and operation. Other more advanced operations, as discussed below, may also be applied by M2M entity 161. In this case, M2M entity 162 may request and indicate operation types to M2M entity 161 in step 164. M2M entity 161 generates cross-resource notification if any target resource has an expected change (e.g., criteria met) within the time window. Other operations may include the following: M2M entity 161 generates cross-resource notification if none of target resources have expected change within the time window; M2M entity 161 generates cross-resource notification if a number of target resources have expected changes within the time window and another number of target resources do not have expected changes within the same time window; M2M entity 161 generates cross-resource notification if a number of target resources have expected changes consecutively within a few time windows; and M2M entity 161 generates cross-resource notification if there is no expected changes consecutively within a few time windows. Another example may be that both listOfTargetResources and listOfEventNotificationCriteria are two ordered list. So, M2M entity 161 generates cross-resource notification, if event notification criteria for the first numOfTargetResourcesForNotification target resources is satisfied; or M2M entity 161 generates cross-resource notification, if the first certain number of event notification criteria are met.

At step 169, M2M entity 161 sends a notification to M2M entity 162 and other entities specified by the notification-URIs assuming the decision from step 168 is yes.

Figure 8:
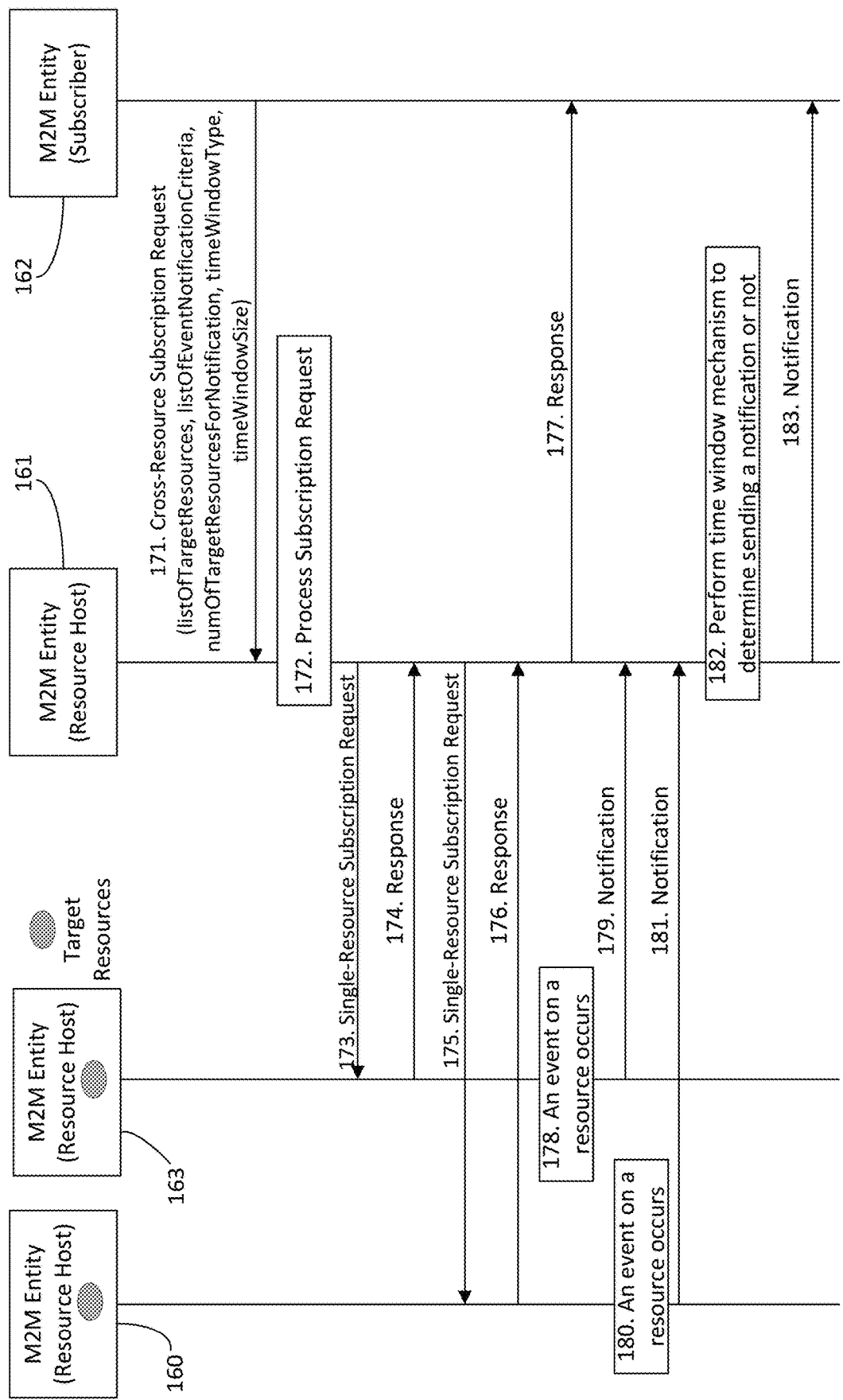
FIG. 8 illustrates an exemplary advanced cross-resource subscription.

FIG. 8 illustrates an exemplary advanced cross-resource subscription. FIG. 8 is a scenario where M2M entity 162 (e.g., an oneM2M IN-AE) still makes cross-resource subscription to M2M entity 161 (e.g., an oneM2M IN-CSE), but M2M entity 161 does not host any target resources. Instead, each target resource is hosted in a different M2M entity (e.g., M2M entity 163 and M2M entity 160 (e.g., an oneM2M MN-CSE) as examples shown in FIG. 8). At step 171, similar to step 164 in FIG. 7, M2M entity 162 in FIG. 8 sends a cross-resource subscription request message to M2M Entity 161. It is contemplated that M2M entity 161 may have the addresses of original resources on M2M entity 163 and M2M entity 160, or M2M entity 162 may directly discover their addresses and inform M2M entity 161 via the parameter listOfTargetResources.

With continued reference to FIG. 8, at step 172, M2M entity 161 processes the subscription request. And it finds the target resources indicated in step 171 are not hosted locally. As a result, it needs to contact other resource hosts. It is assumed that step 171 contains a request for two target resources which are maintained at M2M entity 163 and M2M Entity 160. M2M entity 162 (subscriber) may discover local resources maintained at M2M entity 163 or M2M entity 160 using existing resource discovery procedures defined in oneM2M. In this step 171, for each cross-resource subscription request from M2M entity 162 which is approved by M2M entity 161, M2M entity 161 may create a local subscription resource to maintain the approved cross-resource request. The details about such resource structure are discussed in more detail herein in the context of oneM2M.

At step 173, M2M entity 161 sends a single-resource subscription request (e.g., subscription request as defined in oneM2M) to M2M entity 163 for a single target resource. The event notification criteria for this target resource are from step 171. The notificationURI may be M2M entity 161. In step 171, M2M entity 161 may indicate that this subscription is for M2M entity 162's cross-resource subscription; or M2M entity 161 may not indicate any information about M2M Entity 162's cross-resource subscription. If there is an indication of the cross-resource subscription, M2M Entity 161 may include the identifier of M2M entity 162 in this message.

With continued reference to FIG. 8, at step 174, M2M entity 163 sends a response to M2M entity 161. If the identifier of M2M entity 162 is included in step 173, M2M entity 163 may perform authorization on M2M entity 162 (or with M2M entity 161 together) and send either a successful or failed response to M2M entity 161 based on authorization results. Otherwise, M2M entity 163 may just perform authorization on M2M entity 161 and send response to it. At step 175, M2M entity 161 sends a single-resource subscription request (e.g., subscription request as defined in oneM2M) to M2M entity 160 for a single target resource. The event notification criteria for this target resource are from step 161. The notificationURI may be linked to M2M entity 161. In step 171, M2M entity 161 may indicate that this subscription is for M2M entity 162's cross-resource subscription; or M2M entity 161 may not indicate any information about M2M Entity 162's cross-resource subscription. If there is an indication of the cross-resource subscription, M2M Entity 161 may include the identifier of M2M entity 162 in this message.

At step 176, M2M entity 160 sends a response to M2M entity 161. If the identifier of M2M entity 162 is included in step 175, M2M entity 160 may perform authorization on M2M entity 162 (or with M2M entity 161 together) and send either a successful or failed response to M2M entity 161 based on authorization results. Otherwise, M2M entity 160 may just perform authorization on M2M entity 161 and send a response to it. At step 177, M2M entity 161 sends a response to M2M Entity 162 to indicate the result for step 171, which could be a success or a failure. At step 178, an event on the target resource occurs at M2M entity 163. At step 179, M2M entity 163 sends a notification to M2M entity 161. M2M entity 161 may buffer this notification and do additional processing at a later period, such as at step 182. At step 180, an event on the target resource occurs at M2M entity 160. At step 181, M2M entity 160 sends a notification to M2M entity 161. M2M Entity 161 may buffer this notification for a later processing in step 182. It is assumed that the notifications of step 179 and step 181 are responsive to the events of step 178 and step 180 matching criteria that were met. The criteria may be initially provided in step 171 to M2M entity 161 and then subsequently distributed separately to M2M entities, such as M2M entity 160 and M2M entity 163. At step 182, similar to step 165 in FIG. 7, M2M entity 161 of FIG. 8 performs time window mechanisms to determine if a notification shall be sent to M2M entity 162. If both notifications from step 179 and step 181 were received during the designated time window as specified in step 171, M2M entity 161 generates a notification and send the notification to M2M entity 162 (step 183). The details about time window mechanism are discussed herein. At step 183, M2M entity 161 sends the notification to M2M entity 162. The notification message of step 183 may contain the events that happened in steps 178 and 180. Or the notification message of step 183 may just be an indication to trigger an action based on a pre-configured rule which is application-dependent, but determined by M2M entity 161. For example, M2M entity 162 may send a command to a sensor (or receive a command) to open water. The notification in step 183 may be associated with a detection of fire event.

Some additional considerations with regard to FIG. 8 are discussed below. In FIG. 8, there may be instances where a single-resource subscription request (e.g., step 173 or step 175) fails. In this case, cross-resource subscription from M2M entity 162 would fail as well, which may be contained in the response message of step 177. If step 173 fails first, M2M entity 161 may not contact M2M entity 160 but instead send a failure response to M2M entity 162. If step 173 is successful, but step 175 is unsuccessful, M2M entity 161 may send a failure response to M2M entity 162 (e.g., in Step 177). Furthermore, the subscription created at step 173 and 174 that is associated with M2M entity 163 may be inactived (e.g., deleted). If both step 173 and step 175 are successful, but the target resource at M2M entity 163 (or M2M entity 160) later becomes unavailable or existing subscriptions become invalid, M2M entity 161 may remove its locally created cross-resource subscription for M2M entity 162 and send a failure response. In addition, M2M entity 161 may inactive existing single-resource subscriptions with other resource hosts (e.g., M2M entity 160).

With continued reference to FIG. 8, another consideration is with regard to step 172. In step 172, M2M entity 161 may reject the cross-resource subscription request of M2M entity 162 for any number of reasons. One reason may be that the request would increase the processing or memory above a particular threshold. Another reason may be that a particular quality of service cannot be met. Generally the reasons may be for the request not fitting a particular criteria, which may include being too complex or unable/unlikely to fit within a particular time window). As a result, step 173-step 176 can be skipped (and step 178-step 183 would not occur). M2M entity 161 may just use step 177 to send a response message that includes a notification of failure to M2M entity 162.

Figure 9:
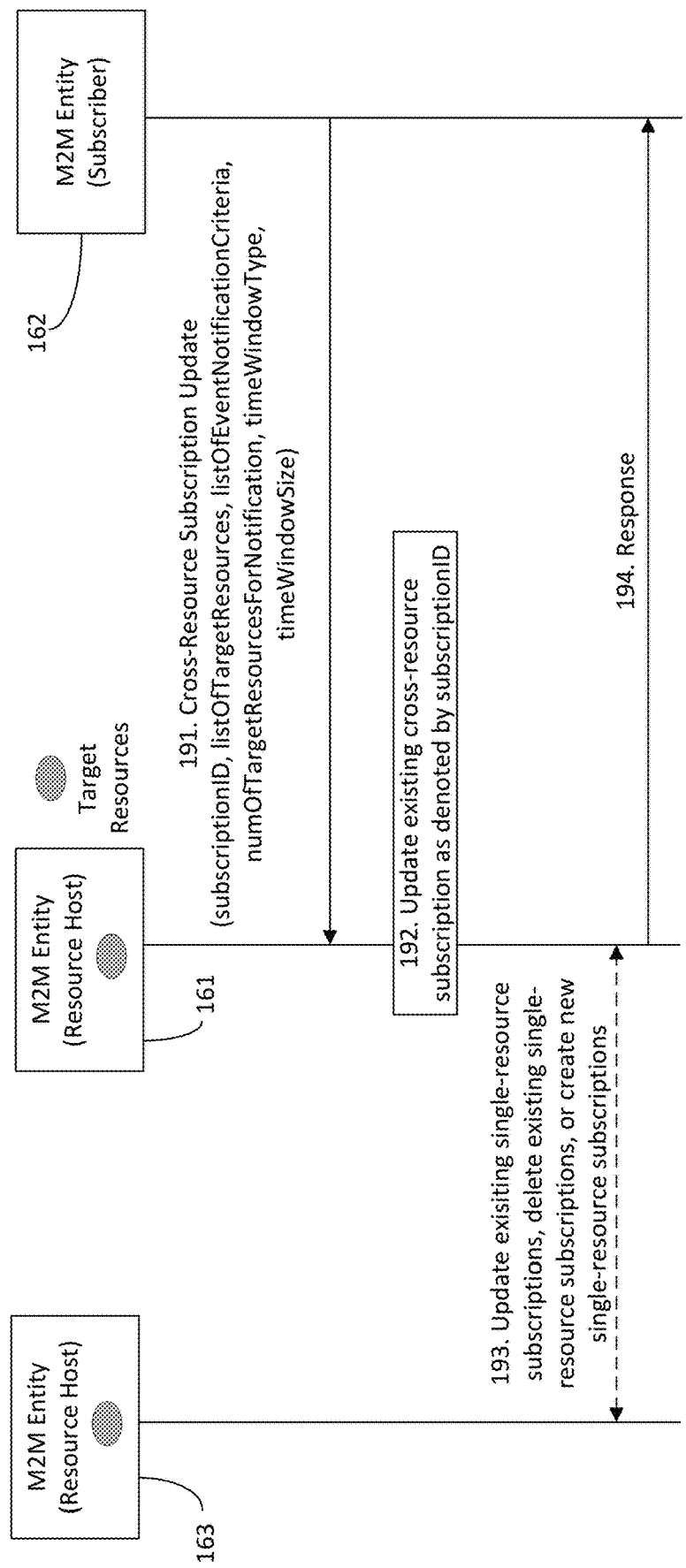
FIG. 9 illustrates an exemplary update an existing cross-resource subscription.

FIG. 9 illustrates an exemplary message flow for updating an existing cross-resource subscription. An existing cross-resource subscription may be updated by the original subscriber (or other eligible entities). For example, a target resource can be removed or a new target resource can be added. Also, event notification criteria or time window size can be changed. At step 191, M2M entity 162 as the original subscriber sends an update message for a cross-resource subscription to M2M entity 161 in order to update the attributes of an existing cross-resource subscription being created according to procedures in FIG. 7 or FIG. 8, for example. The update message of step 191 may include following parameters: subscriptionID, listofTargetResource, eventNotificationCriteria, numOfTargetResourcesForNotification, timeWindowType, or timeWindowSize. subscriptionID may be considered the URI of the existing cross-resource subscription that will be updated. The listOfTargetResource may be considered the list of all new target resources. The listOfTargetResource may also simply indicate existing target resources to be deleted or new target resources to be appended. The eventNotificationCriteria may be considered the new event notification criteria. If there is any new target resource to be added, eventNotificationCriteria indicates notification criteria for these new target resources. The numOfTargetResourcesForNotification may be considered a new number of required target resources for generating a notification. The timeWindowType is a new time window type. The timeWindowSize may be considered a new size of the time window for determining notifications.

At step 192, M2M entity 161 uses subscriptionID to find the existing cross-resource subscription and update its attributes according to the parameters included in step 191. If timeWindowType or timeWindowSize are requested to change, M2M entity 161 will reset the current time window with existing events disregarded and restart a new time window. If numOfTargetResourcesForNotification is changed, M2M entity 161 may keep the current time window, but a cross-resource notification may be generated sooner (e.g., numOfTargetResourcesForNotification is reduced) or later (e.g., numOfTargetResourcesForNotification is increased).

With continued reference to FIG. 9, at step 193, M2M entity 161 may contact other resource hosts (e.g., M2M entity 163) where some target resources involved in the updated cross-resource subscription reside. If M2M entity 162 requests to update event notification criteria on a target resource which resides at M2M entity 163, M2M entity 161 can inform M2M entity 163 of the new event notification criteria. If M2M entity 162 requests to remove a target resource from listOfTargetResouce and a target resource is located at M2M entity 163, M2M entity 161 will contact M2M entity 163 to delete the previously created single-resource subscription associated with this target resource. If M2M entity 162 requests to add a new target resource to listOfTargetResource and this target resource is located at M2M entity 163, M2M entity 161 may contact M2M entity 163 to create a new single-resource subscription at M2M entity 163. At step 194, M2M entity 161 sends a response to M2M entity 162 about the update operation results in step 192 and step 193, such as information indicative of success or failure, among other things.

Figure 10:
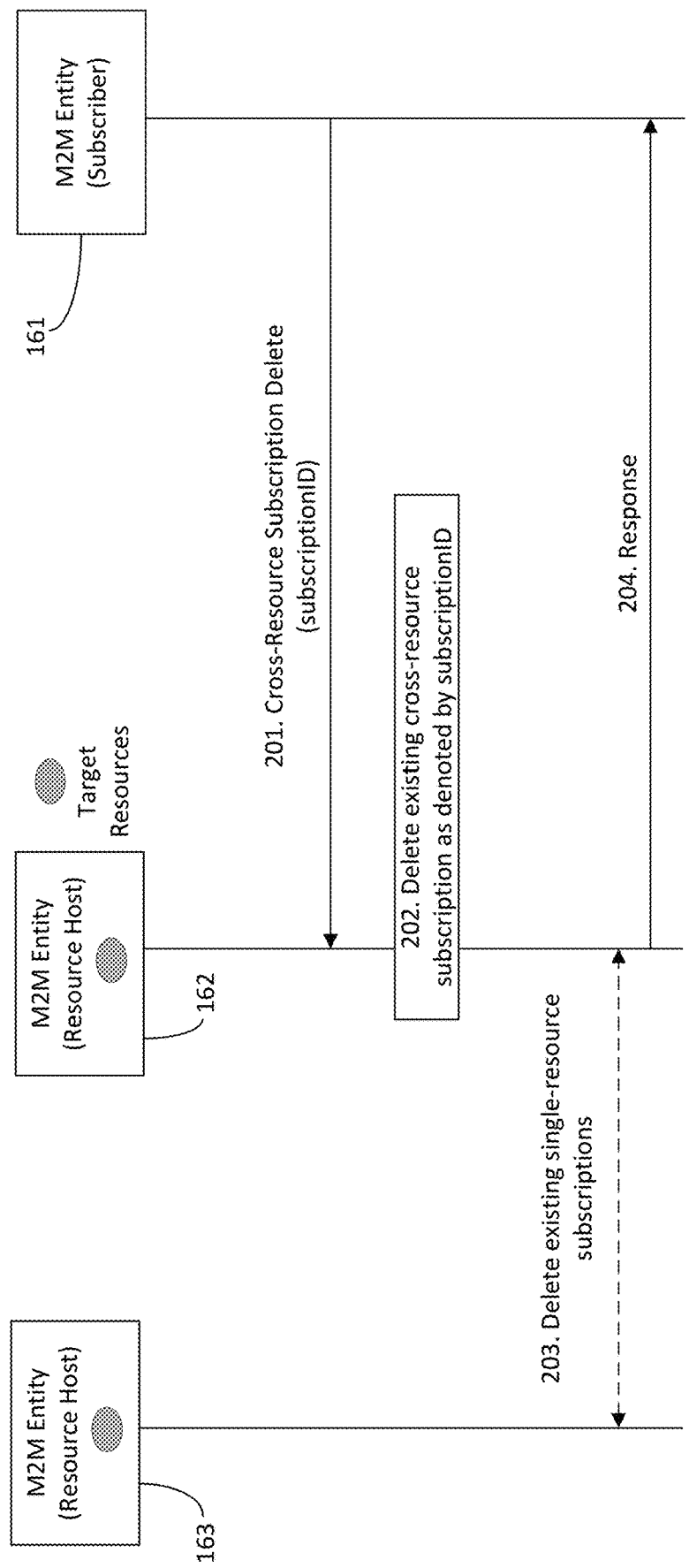
FIG. 10 illustrates an exemplary delete an existing cross-resource subscription.

FIG. 10 illustrates an exemplary message flow for updating an existing cross-resource subscription. An existing cross-resource subscription can be deleted by the original subscriber (or other eligible entities). At step 201, M2M entity 162 (e.g., the original subscriber) sends a message to M2M entity 161 to delete an existing cross-resource subscription being created according to procedures in FIG. 7 or FIG. 8, for example. This delete message of step 201 may include a subscriptionID, which may be the URI of the existing cross-resource subscription which will be deleted. At step 202, M2M entity 161 uses subscriptionID to find the existing cross-resource subscription to delete. At step 203, M2M entity 161 may contact other resource hosts (e.g., M2M entity 163) where some target resources involved in the deleted cross-resource subscription reside, to delete existing single-resource subscription associated with the deleted cross-resource subscription. At step 204, M2M entity 161 sends a response to M2M entity 162 about the delete operation results in step 202 and step 203, such as information indicative of success or failure, among other things.

Discussed below are time window mechanisms used in determining whether to send cross-resource notifications. In each cross-resource subscription, multiple target resources are involved and the event for each target resource may occur at different time. As a result, the resource host (e.g., M2M entity 161) may determine if it needs to issue a notification to the original subscriber according to the parameter timeWindowSize indicated by the original subscriber. Time window mechanisms "periodical time window" and "sliding time window" are discussed herein. With regard to periodical time window, the time is divided into time windows with the same size. For each time window, the resource host issues a notification when criteria are met for the target resources within the time window. With regard to the sliding time window, the starting time of the time window dynamically changes each time after a cross-resource notification is generated or the present time window expires. The resource host uses similar logic to issue a notification (e.g., only if expected events for target resource occur in a time window).

Note that timeWindowSize can be set to zero. To implement such a time window with zero value, when one of the designated event conditions is triggered, the resource host has to check if other event notification criteria are also met. The notification is sent if the conditions are substantially simultaneously satisfied. For example, if a subscriber wants a notification when {"event1: (temperature>25)" AND "event2: (smokeSensor='Detected')" }happens, the subscriber could specify a time window of zero to imply that the two events have to be happening at the same time.

Figure 11:
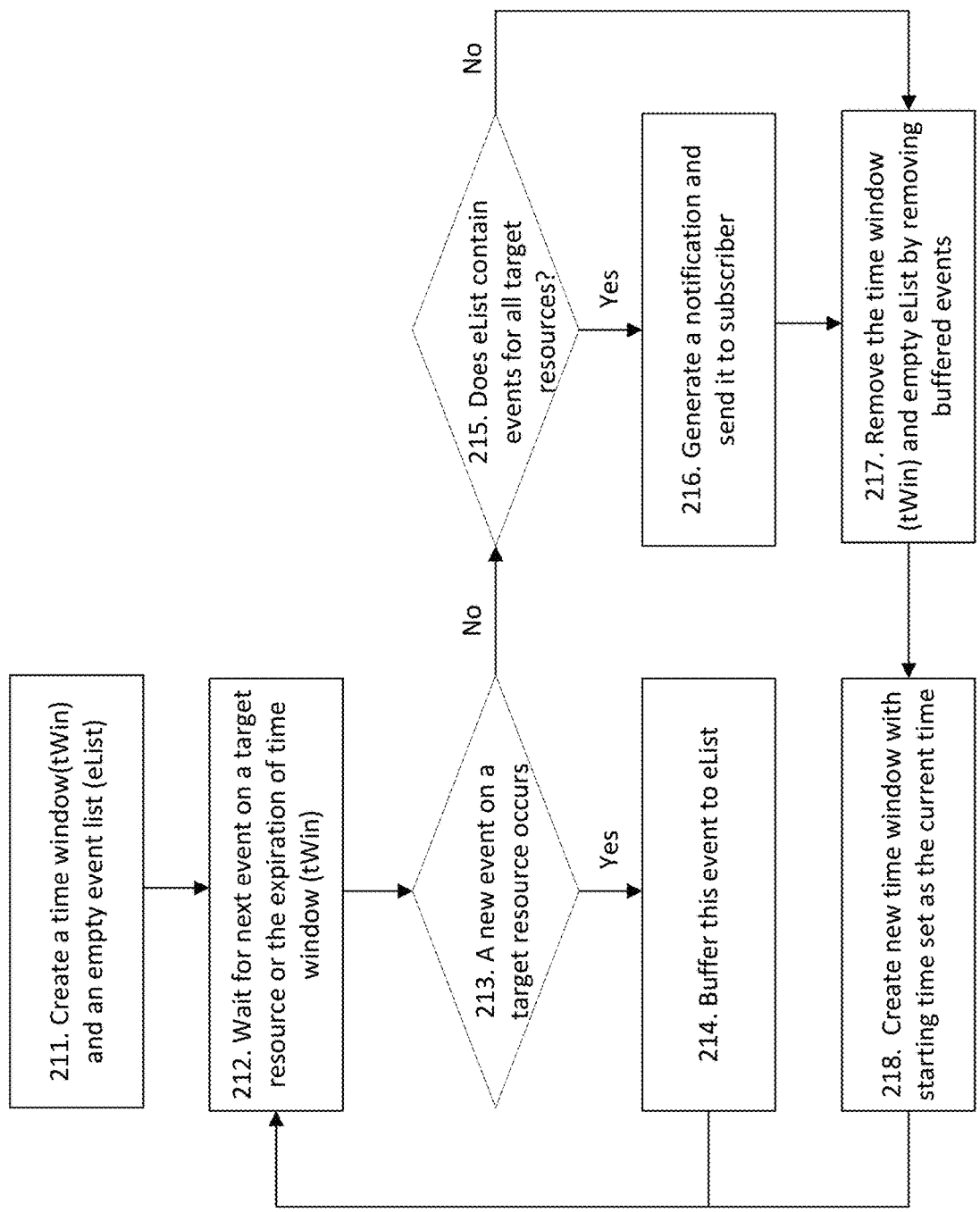
FIG. 11 illustrates an exemplary flow chart for periodical time window mechanism to generate cross-resource notifications.

FIG. 11 illustrates an exemplary method for a periodical time window. At step 211, a resource host (e.g., M2M entity 161 or M2M entity 160) creates a time window (tWin) and an event list (eList), which may be empty. At step 212, M2M entity 161 waits for next event of a target resource or the expiration of the time window (tWin). At step 213, if a new event on a target resource occurs, move to step 214; otherwise move to step 215 if a time window expires. At step 214, M2M entity 161 may buffer this event to eList. At step 215, M2M entity 161 checks if eList contains expected events for the target resources (i.e., meets the criteria). If yes, move to step 216; otherwise, go to step 217. At step 216, M2M entity 161 may generate a notification and send it to targets, such as targets represented by notificationURI. At step 217, M2M entity 161 removes the time window (tWin) and empties eList by removing all buffered events. At step 218, M2M entity 161 creates a new time window and sets its starting time as the current time. It should be understood that a resource host does not have to wait to the end of the time window to send the notification. The resource host sends the notification once the criteria are met within the time window. For example, the notification may be sent at t14 in tWin 252 of FIG. 13.

Figure 12:
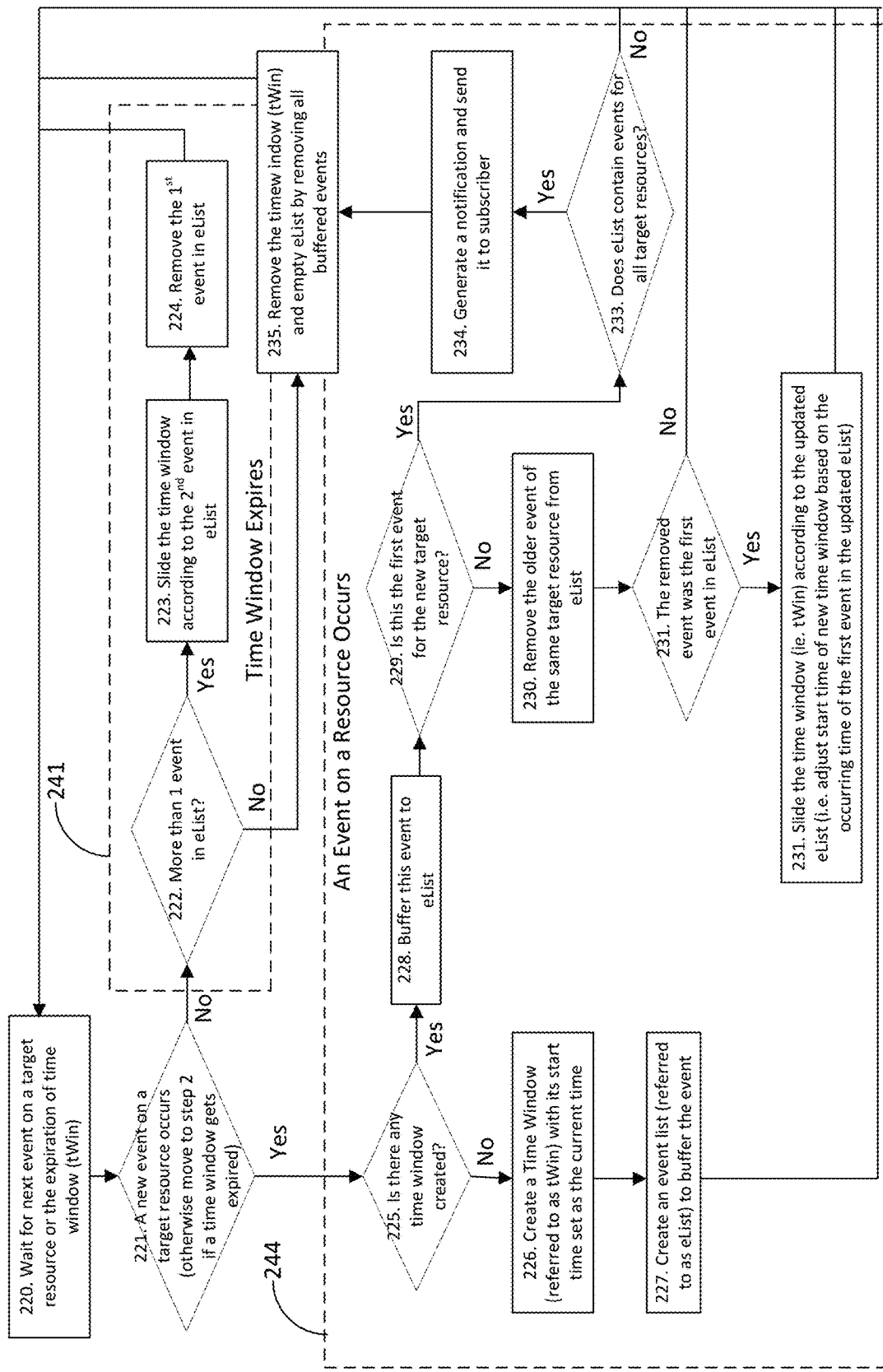
FIG. 12 illustrates an exemplary flow chart for sliding time window mechanism to generate cross-resource notifications.

FIG. 12 illustrates an exemplary method for a sliding time window. At step 220, a resource host (e.g., M2M entity 161 or M2M entity 163) waits for next event on a target resource or the expiration of an initiated time window (tWin). After step 220, at step 221, if a new event of a target resource occurs, move to step 225, which is the start of block 244 with regard to an event on a resource that occurs; otherwise move to step 222 if a time window expires. Step 222 is the beginning of a block 241 of steps with regard to time window expiring.

Within block 241, at step 222, M2M entity 161 checks how many events that are included in eList. If there is more than 1 event (Yes), move to step 223; otherwise (No), move to step 235. At step 223, M2M entity 161 slides the current time window according to the second event in the list of buffered event list (e.g., eList). In other words, the starting time of time window will be updated to the occurring time of the second event. Note that if eList contains only one event, the resource host just simply removes current time window. For example, in FIG. 13, tWin 273 in illustration 270, which refers to the "sliding time window," has only one event (event resource type 281) that occurs at time t4. At time t5, tWin 273 expires and the eList and time will be reset since there was only one event. Then, a new time window (e.g., tWin 274) will be restarted at time t6 when a new event occurs (event resource type 282). A reset may also happen if all the targeted resources don't match the criteria within the time window. At step 2247, the first event in eList will be removed. Now, the second event becomes the first event in eList. Then step 220 is a next step.

At step 225, M2M Entity 161 checks if there is a time window already created. If No, move to step 226; otherwise, move to step 228 if the time window exists. At step 226, M2M Entity 161 creates a time window (referred to as tWin, herein) that sets its starting time as the current time, which may be approximately the time of receiving an indication of the event that matched the predetermined criteria. At step 227, M2M Entity 161 creates an event list (referred to as eList) and inserts this event to it as the first event. After the eList is created then step 220 may occur. At step 228, there is an eList already created. The resource host appends this event to the end of eList. At step 229, M2M Entity 161 checks whether this event is the first event for a target resource. If no, move to step 230; otherwise, move to step 233, if yes. At step 230, an older event for the same target resource is removed from eList. At step 231, the resource host checks if the removed older event was the first event in eList. If yes to step 231, move to step 232; otherwise, go to step 220. At step 232, M2M Entity 161 may slide the time window according to the updated eList. In other words, the starting time of the time window is set to the occurring time of the first event in the updated eList. At step 233, M2M Entity 161 checks if eList contains expected events for the targeted resources. If yes, move to step 234; otherwise, go to step 220. At step 234, M2M Entity 161 generates a notification and sends it to notification targets as represented by notificationURI. At step 235, M2M Entity 161 removes the time window and eList, then goes to step 220.

Figure 13:
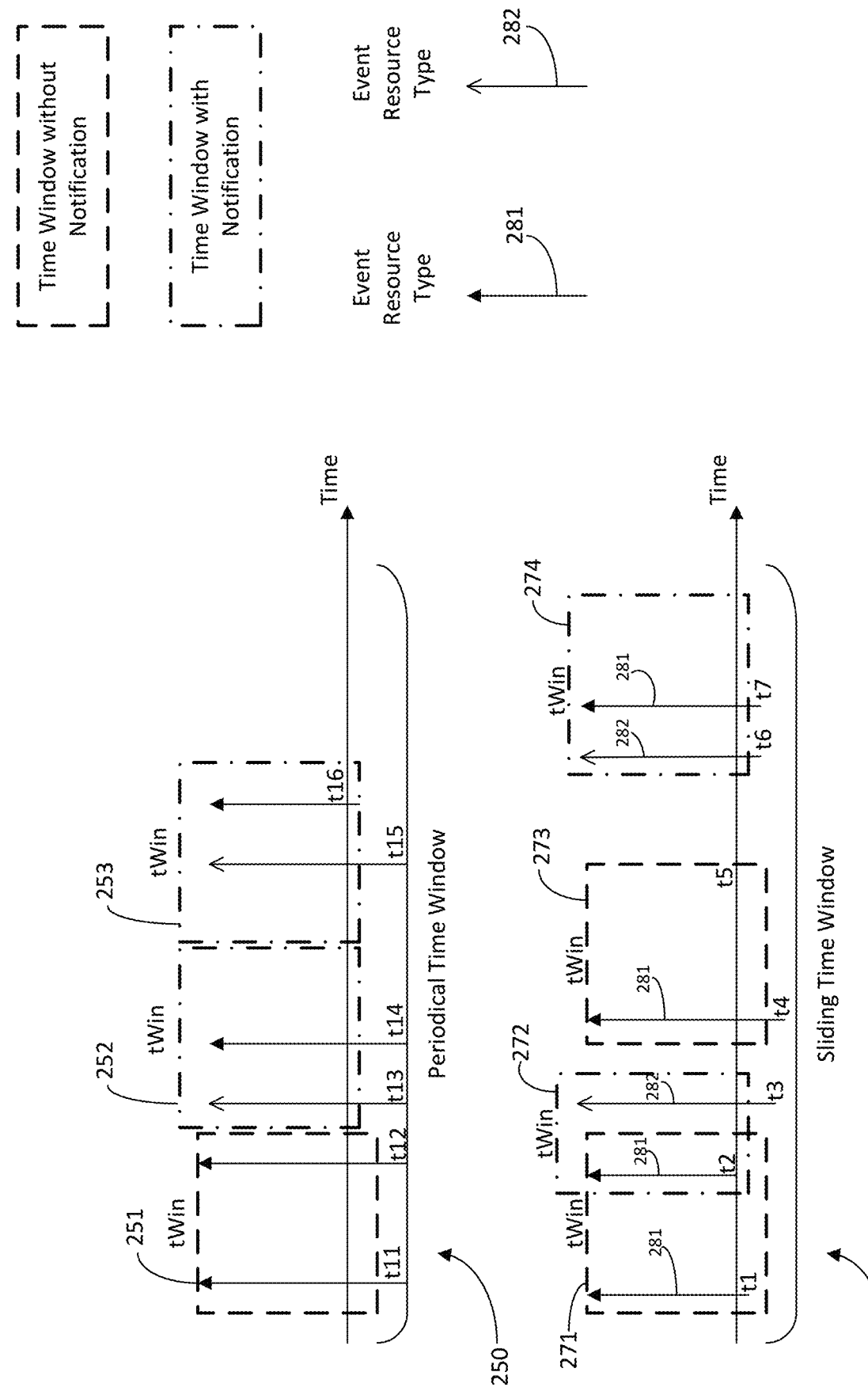
FIG. 13 illustrates an exemplary time window mechanisms.

FIG. 13 illustrates examples for periodical time window and sliding time window. In this example, it is assumed there are two target resources: event resource type 281 and event resource type 282. The event resource types shown are an indicative that at least one criterion is met for one target resource at a time instance (e.g., t11, t12, t13, t14, t15). A periodic time window is a time window mechanism where the starting time of a new time window usually appears at fix time instances or periods. As shown in FIG. 13, with regard to illustration 250 (a periodical time window), three consecutive time windows (e.g., tWin 251, tWin 252, and tWin 253) are created, but only tWin 252 and tWin 253 contains events of both resources. As a result, there is no notification in tWin 251, but a notification will be generated for tWin 252 and tWin 253. In other words, tWin 251 is a time window without triggered notification based on not meeting the criteria for the targeted resources, while tWin 252 and tWin 253 are time windows that have a triggered notification based on meeting the criteria for the targeted resources. As shown in FIG. 13, with regard to illustration 270 (a sliding time window), four time windows (e.g., tWin 271, tWin 272, tWin 273, and tWin 274) are generated. Note that each time window is actually initiated by the occurrence of an event that matches a criterion for a targeted resource at time instance. (e.g., t1, t2, t3, t4, t6, t7). Illustration 270 shows that tWin 272 and tWin 274 contain events that meet the predetermined criteria of each of the target resources and will generate a notification. It is assumed here in FIG. 13 that event resource type 281 and event resource type 282 are the only targeted resources needed to trigger a notification.

Below are examples for implementing cross-resource subscription in oneM2M architecture. Discussed below are high-level architecture options, new resources and attributes and corresponding call flows. Also user interface is discussed with regard to an exemplary display or configuration of cross-resource subscription related parameters and information.

With regard to oneM2M, the procedures and processes related to resource host (e.g., M2M entity 161) may be implemented in a CSE (e.g., M2M service layer 22 of FIG. 20A). And procedures and processes related to subscriber (e.g., M2M entity 162 in FIG. 8) in an AE (or a CSE if it is a subscriber).

Figure 14:
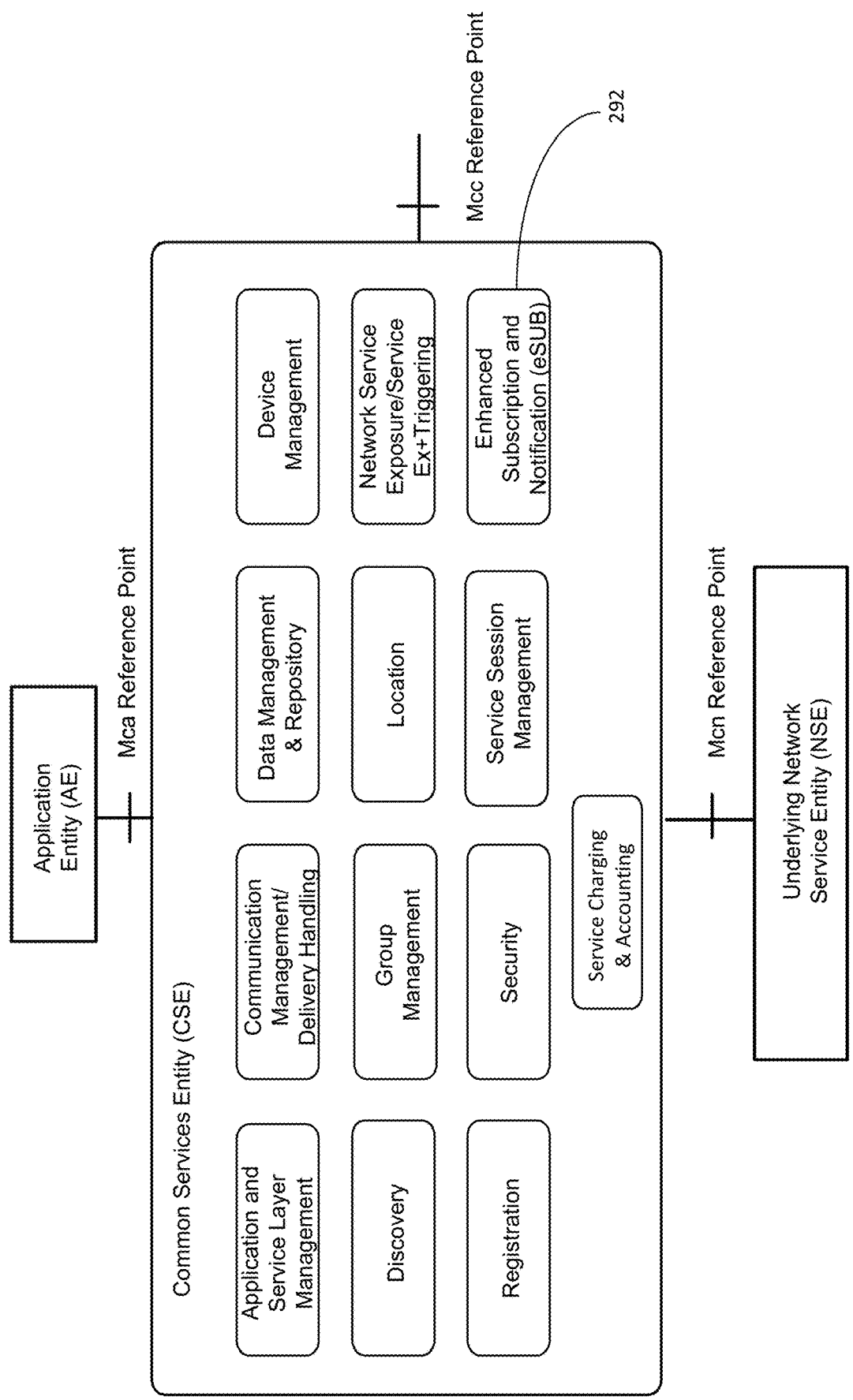
FIG. 14 illustrates an exemplary new enhanced subscription and notification (eSUB) CSF into oneM2M ROA.

FIG. 14 illustrates an example for implementing the disclosed with regard to cross-resource subscription or notification to existing SUB CSF to form an Enhanced Subscription and Notification (eSUB) CSF 292 based on oneM2M. This new eSUB 292 supports procedures and processes related to resource host as described herein. eSUB 292 may reside in IN-CSE, MN-CSE, or ASN-CSE.

FIG. 15 illustrates three exemplary deployments of cross-resource subscription in oneM2M. FIG. 15A illustrates an example with a subscriber as an AE (e.g., IN-AE, MN-AE, ASN-AE, or ADN-AE), while the resource host is a hosting CSE with eSUB. The procedures discussed herein are applied to Mca reference point 295 between hosting CSE 294 (resource host) and AE 296 (susbscriber). The proposed new resource <xRsrcSub> will reside in the hosting CSE with eSub (e.g., IN-CSE, MN-CSE, or ASN-CSE). FIG. 15B illustrates an example with a subscriber as a CSE 299 (e.g., MN-CSE, IN-CSE), while the resource host is a hosting CSE 297 with eSUB. The procedures discussed herein are applied to Mcc/Mcc' reference point 298 between hosting CSE 297 and CSE 299, which is a subscriber. The disclosed new resource <xRsrcSub> will reside in the Hosting CSE with eSub (e.g., IN-CSE). FIG. 15C illustrates an example with a subscriber as an AE (e.g., IN-AE), while its target resources are distributed in three CSEs (e.g., hosting CSE 303 with eSUB, MN-CSE 305, and MN-CSE 307). The procedures discussed herein are applied to Mca reference point 302 between the hosting CSE with eSUB and the subscriber AE 301. In this case, MN-CSE 305 and MN-CSE 307 do not support eSUB, but only have existing SUB functionalities in oneM2M. The disclosed new resource <xRsrcSub> will reside in hosting CSE 303 with eSub (e.g., IN-CSE)

Figure 16:
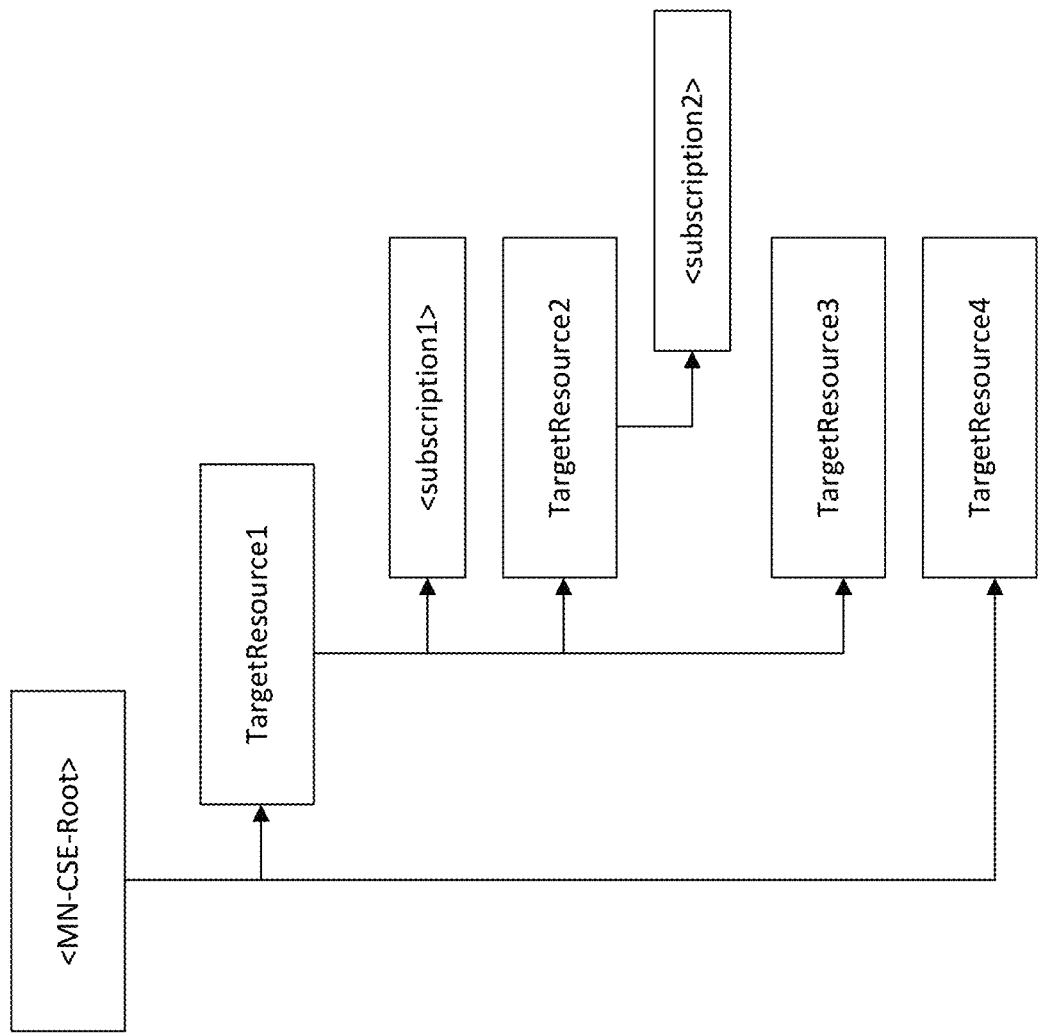
FIG. 16 illustrates an exemplary conventional resource structure, where the subscription is a child to the pertinent resources.
Figure 17:
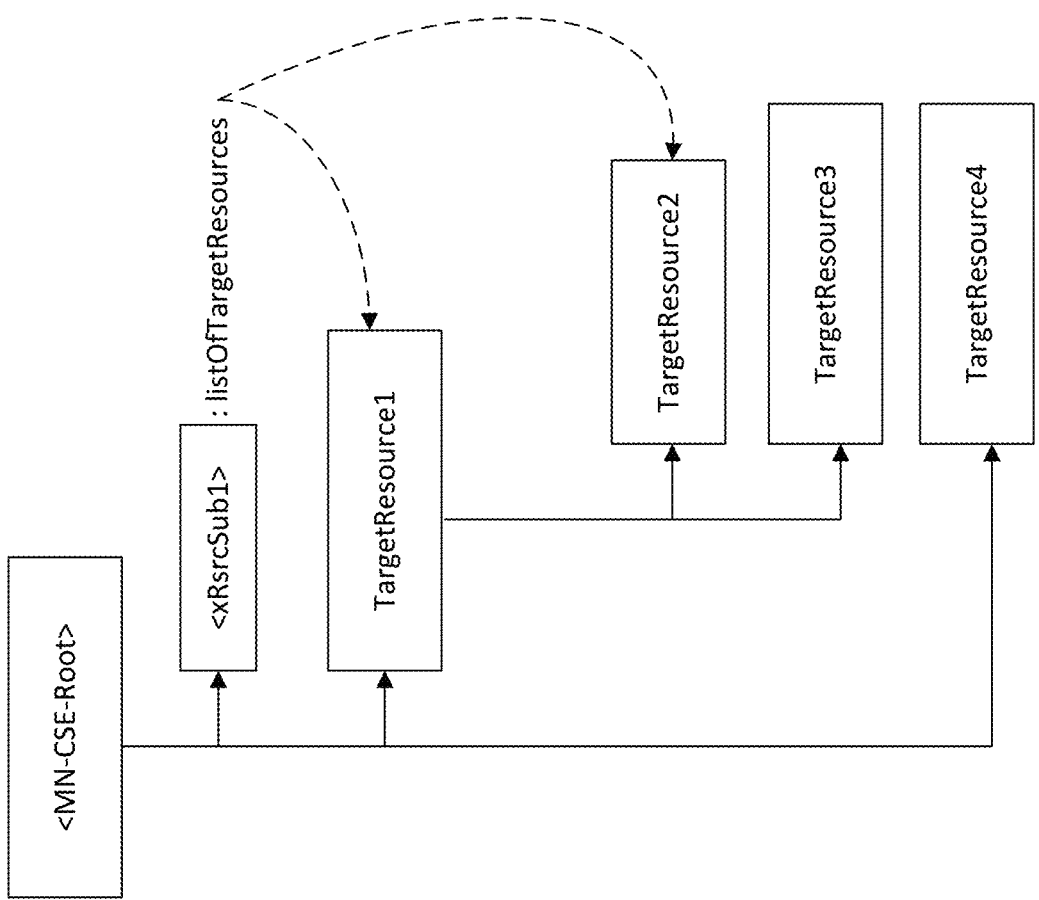
FIG. 17 illustrates an exemplary resource structure for the cross-resource subscription and notification system.

To support the procedures with regard to FIG. 7-FIG. 10, a new subscription resource (referred to as <xRsrcSub>) is discussed herein for oneM2M, for example. <xRsrcSub> may have all child resources and attributes (e.g., notificationURI) of existing <subscription> resource except eventNotificationCriteria and a few new attributes as shown in Table 1. Table 1 is an example of new attributes. Since target resources are denoted by a dedicated attribute listOfTargetResources, it may not matter where <xRsrcSub> is created under <sclBase> resource tree. FIG. 17 illustrates an example of the effect of the cross-resource subscription and notification system as discussed herein. Basically, <xRsrcSub> can be placed in various places (e.g., a child resource of a <AE>, a child resource of a <CSE>, a child resource of a <CSEBase>, or a child resource of a <group>), which is different from conventional <subscription> resource in oneM2M architecture. FIG. 16 illustrates an example of a conventional resource structure, where the subscription is a child to the pertinent resources.

TABLE 1

| Attributes of <subscription> | Description |
|---|---|
| New Attributes of New <xRsrcSub> Resource | |
| listOfTargetResources | This attribute indicates the list of target resources involved in a cross-resource subscription. Each item in this list stands for a separate target resource and may be an identifier or a URI of an individual target resource. Optionally, this attribute could be an identifier or URI of an oneM2M <group> resource; in this case, each member of this <group> resource will be the target resource. In addition, each item of this list could be an identifier or URI of an existing oneM2M <subscription> resource. In this case, listOfEventNotificationCriteria attribute may not be needed since <subscription> has an attribute about event notification criteria. |
| listOfEventNotification Criteria | This attribute indicates event notification criteria for each target resource contained in listOfTargetResources attribute. Each item in this list is a separate event notification criteria for a different target resource, or this attribute indicates the overall event notification criteria on all target resources as a whole. The first item in this list corresponds to the first item in listOfTargetResources and so on. If all target resources have the same event notification criteria, this attribute may only have one item and one value. |
| numOfTargetResources ForNotification | This attribute indicates the required number of target resources for generating a cross-resource notification. It cannot be larger than the number of target resources included in listOfTargetResources attribute. If this attribute is not used, the number of target resources included in listOfTargetResources attribute will be applied. |
| timeWindowType | This attribute indicates the type of time window mechanisms (e.g., "timeWindowType = 1" stands for periodical time window and "timeWindowType = 2" represents sliding time window). |
| timeWindowSize | This attribute indicates the size or time duration (e.g., in seconds) of the time window, based on which cross-resource notification will be determined and generated. |
| originalSubscriberID | This attribute, when it appears in a subscription request message, indicates the identifier or an original subscriber. The receiver of this subscription request message may perform subscription authorization on the original subscriber (or with the sender of this subscription request message together). |

<xRsrcSub> resource procedures may be used to request the creation of a new <xRsrcSub> resource to be notified for the modifications of multiple target resources denoted by listOflargetResources. The generic create procedure is described in clause 10.1.1.1 in oneM2M (oneM2M-TS-0001, oneM2M Functional Architecture, V-2.3.0—hereinafter [1]). Table 2 illustrates an exemplary <xRsrcSub> CREATE.

TABLE 2

| <xRsrcSub> CREATE | |
| --- | --- |
| <xRsrcSub> CREATE | |
| Associated Reference Point | Mca, Mcc and Mcc' |
| Information in Request message | Parameters defined in table 8.1.2-2 in oneM2M [1] apply with the specific details for:<br>Content: The resource content shall provide presentation of <xRsrcSub> to be created, especially the value of its attributes indicated in Table 1. |
| Processing at Originator before sending Request | According to clause 10.1.1.1 in [1]with the following additions:<br>The Request includes listOfTargetResources<br>The Request includes timeWindowType and timeWindowSize<br>The Request includes listOfEventNotificationCriteria<br>The Request includes notificationURI(s)<br>If the request includes notificationURI(s) which is not the Originator, the Originator may send the request as non-blocking request (see clauses 8.2.2 and 9.6.12 in [1]) |
| Processing at Receiver | According to clause 10.1.1.1 in [1]with the following<br>Which is also the Hosting CSE may validate the followings:<br>Check if the Originator has privileges for creating a child resource in the To parameter in the Request.<br>Check if each target resource in listOfTargetResources is a subscribable resource.<br>Check if the Originator has privileges for retrieving the resource denoted by the To parameter in the Request.<br>If a notificationURI is not the Originator, the Hosting CSE may send a Notify request to the notificationURI to verify this <xRsrcSub> creation request. If the Hosting CSE initiates the verification, it shall check if the verification result in the Notify response is successful or not. If any notificationURI contained in a list fails verification then the <xRsrcSub> create process fails<br>If any of the checks above fails, the hosting CSE shall send an unsuccessful response to the Originator with corresponding error information. Otherwise, the hosting CSE shall create the <xRsrcSub> resource and send a successful response to the Originator |
| Information in Response message | Parameters defined in table 8.1.3-1 in [1] apply with the specific details for:<br>Content: address of the created <xRsrcSub> resource, according to clause 10.1.1.1 in [1] |
| Processing at Originator after receiving Response | According to clause 10.1.1.1 in[1] |
| Exceptions | According to clause 10.1.1.1 in [1]. |

Procedures may be used to retrieve attributes and child resource information of a <xRsrcSub> resource. The generic retrieve procedure is described in clause 10.1.2 in [1]. Table 3 is an exemplary <ZxRsrcSub> RETRIEVE.

TABLE 3

| <xRsrcSub> RETRIEVE | |
| --- | --- |
| <xRsrcSub> RETRIEVE | |
| Associated Reference Point | Mca, Mcc and Mcc' |
| Information in Request message | Parameters defined in table 8.1.2-2 in [1] apply with the specific details for:<br>Content: void |
| Processing at Originator before sending Request | According to clause 10.1.2 in [1] |
| Processing at Receiver | According to clause 10.1.2 in [1] |

TABLE 3-continued

| | <xRsrcSub> RETRIEVE |
| --- | --- |
| | <xRsrcSub> RETRIEVE |
| Information in Response message | All parameters defined in table 8.1.3-1 in [1] apply with the specific details for:<br>Content: attributes of the <xRsrcSub> resource |
| Processing at Originator after receiving Response | According to clause 10.1.2 in [1] |
| Exceptions | According to clause 10.1.2 in [1] |

Procedures may be used to update an existing cross-resource subscription (e.g., a <xRsrcSub> resource), e.g., the modification of its attributes such as listOfTargetResources. The generic update procedure is described in clause 10.1.3 in [1]. Table 4 is an exemplary <xRsrcSub> UPDATE.

TABLE 4

| | <xRsrcSub> UPDATE |
| --- | --- |
| | <xRsrcSub> UPDATE |
| Associated Reference Point | Mca, Mcc and Mcc'. |
| Information in Request message | Parameters defined in table 8.1.2-2 in [1] apply with the specific details for:<br>Content: attributes of the <xRsrcSub> resource which need be updated. |
| Processing at Originator before sending Request | According to clause 10.1.3 in [1]. |
| Processing at Receiver | According to clause 10.1.3 in [1]<br>If a notificationURI is not the Originator, see table 10.2.11.2-1 in clause 10.2.11.2 in [1]<br>If the latestNotify attribute is set, the Hosting CSE shall assign Event Category parameter of value 'latest' of the notifications generated pertaining to the subscription created |
| Information in Response message | According to clause 10.1.3 in [1]. |
| Processing at Originator after receiving Response | According to clause 10.1.3 in [1]. |
| Exceptions | According to clause 10.1.3 in [1]. |

Procedures may be used to unsubscribe an existing cross-resource subscription (i.e., a <xRsrcSub> resource). The generic delete procedure is described in clause 10.1.4.1 in [1]. Table 5 is an example of <xRsrcSub> DELETE.

TABLE 5

| | <xRsrcSub> DELETE |
| --- | --- |
| | <xRsrcSub> DELETE |
| Associated Reference Point | Mca, Mcc and Mcc'. |
| Information in Request message | All parameters defined in table 8.1.2-2 in [1] apply. |
| Processing at Originator before sending Request | According to clause 10.1.4.1 in [1]. |
| Processing at Receiver | According to clause 10.1.4.1 in [1]. |
| Information in Response message | According to clause 10.1.4.1 in [1]. |
| Processing at Originator after receiving Response | According to clause 10.1.4.1 in [1]. |
| Exceptions | According to clause 10.1.4.1 in [1]. |

After the hosting CSE receives a <xRsrcSub> creation (or a <xRsrcSub> update), it performs time window mechanism as described herein to determine if a notification needs to be issued. Only when expected changes on the target resources occurs within a time window, does the hosting CSE issue a notification to the originator or its designated notification receivers.

The conventional <subscription> resource in oneM2M may be extended to support the disclosed cross-resource subscription by adding a few new attributes as described in Table 6, for example. In other words, by using these new attributes, a subscriber (e.g., creator or a <subscription>) may trigger or enable cross-resource subscription. In an example, assume an IN-CSE has a <group> resource (e.g., <inCSEBase>/<group>) which has two members <container1> and <container2>. If an IN-AE wants to receive automatic notification when the value of both container resources exceed a threshold, it may create a <subscription> as the child resource of this <group> resource and set appropriate values for new attributes using the CREATE command below. Then IN-CSE issues a notification, if the value of both container resources is changed to exceed the threshold within the timeWindowSize (e.g., 60 seconds). An example CREATE command: CREATE <inCSEBase>/<group>/<subscription>; payload: −30-ubtype=1 (cross-resource subscription), timeWindowType=1 (e.g., periodical time window), timeWindowSize=60 seconds.

TABLE 6

New Attributes of <subscription> Resource

| Attributes of <subscription> | Description |
|---|---|
| listOfChildSubscriptionIDs | This attribute indicates the list of existing <subscription> resources. Each item in this list can be an identifier or a URI of an existing <subscription> resource. By having this new attribute, the present <subscription> will issue a notification if the event notification criteria of all <subscription> resources contained in this attribute is satisfied. Similar to <xRsrcSub> resource, after having this new attribute, the place to create the present <subscription> may not matter, since the notification will be determined based on other existing <subscription> resource as denoted by this new attribute. Note that these existing <subscription> resources contained in this attribute and the present <subscription> do not have to stay in the same CSE.<br>Below is an example: Assume there are 3 existing <subscription> resources (e.g., <subscrptionX>, <-31-ubtype-31-tion>, and <subscriptionZ>) and listOfChildSubscriptionIDs include the identifiers of these three resources. As a result, the present <subscription> resource which has listOfSubscriptionIDs as its attribute actually depends on these three existing <subscription> resources. In other words, only when event notification criteria of <-31-ubtype-31-tion>, <-31-ubtype-31-tion>, and <subscriptionZ> is all met, the present <subscription> would issue a notification.<br>This attribute may not be needed, if the present <subscription> resource is a child resource of a <group> resource. |
| listOfParentSubscriptionIDs | This attribute indicates the identifiers of a list of existing cross-resource subscriptions, which the present <subscription> is associated with it as a single-resource subscription. |
| subType | This attribute indicates the subscription type of present <subscription> resource (e.g., "-32-ubtype = 1" stands for cross-resource subscription, "subtype = 0" stands for existing oneM2M subscription).<br>If subtype indicates that the present <subscription> is a cross-resource subscription, the following two attributes "timeWindowType" and "timeWindowSize" are needed. |
| listOfEventNotificationCriteria | Similar to listOfEventNotificationCriteria in Table 1. This attribute may only be needed when-32 -ubtype indicates cross-resource subscription and there is no listOfSubscriptionIDs. |
| numOfTargetResourcesForNotification | This attribute indicates the required number of target resources for generating a cross-resource notification. It cannot be larger than the number of target resources indicated by listOfChildSubscriptionIDs. If this attribute is not used, the number of target resources indicated in listOfChildSubscriptionIDs attribute will be applied. |
| timeWindowType | This attribute indicates the type of time window mechanisms (e.g., "timeWindowType = 1" stands for periodical time window and "timeWindowType = 2" represents sliding time window). |
| timeWindowSize | This attribute indicates the size or time duration (e.g., in seconds) of the time window, based on which cross-resource notification will be determined and generated. Note that the maximum window size (e.g., 60 seconds) may be enforced by the hosting CSE for a subscriber. If the timeWindowSize indicated or requested by a subscriber is larger than the maximum window size, the hosting CSE can reject the subscriber's request. |
| originalSubscriberID | This attribute, when it appears in a subscription request message, indicates the identifier or an original subscriber. The receiver of this subscription request message may perform subscription authorization on the original subscriber (or with the sender of this subscription request message together). |

With the proposed new attributes to <subscription> resource, the procedure for creating a <subscription> in oneM2M may be updated. But procedures for retrieving a <subscription>, updating a <subscription>, and deleting a <subscription> may be the same as existing ones in oneM2M [1].

Create <Subscription>

This procedure shall be used to request the creation of a new <subscription> resource to be notified for the modifications across multiple target resources. The generic create procedure is described in clause 10.1.1.1 in [1].

TABLE 7

Modified <subscription> CREATE
<subscription> CREATE

| | |
|---|---|
| Associated Reference Point | Mca, Mcc and Mcc' |
| Information in Request message | All parameters defined in table 8.1.2-2 in [1] apply with the specific details for:<br>Content: The resource content shall provide values of attributes of <subscription> including these new attributes shown in Table 6. |
| Processing at Originator before sending Request | According to clause 10.1.1.1 in [1]with the following additions:<br>The Request shall include listOfChildSubscriptionIDs<br>The Request shall include timeWindowType and timeWindowSize<br>The Request shall include listOfEventNotificationCriteria<br>The Request shall include notificationURI(s)<br>If the request includes notificationURI(s) which is not the Originator, the Originator should send the request as non-blocking request (see clauses 8.2.2 and 9.6.12 in [1]) |
| Processing at Receiver | According to clause 10.1.1.1 in [1] with the following<br>Which is also the Hosting CSE may validate the following:<br>Check if the Originator has privileges for creating a child resource in the To parameter in the Request.<br>Check if the Originator has privileges for accessing each <subscription> resource contained in listOfSubscriptionIDs.<br>Check if the Originator has privilege for retrieving the resource denoted by the To parameter in the Request.<br>If a notificationURI is not the Originator, the Hosting CSE may send a Notify request to the notificationURI to verify this <subscription> creation request. If the Hosting CSE initiates the verification, it shall check if the verification result in the Notify response is successful or not. If any notificationURI contained in a list fails verification then the <subscription> create process fails<br>If any of the checks above fails, the Hosting CSE can send an unsuccessful responseto the Originator with corresponding error information. Otherwise, the Hosting CSE may create the <subscription> resource and send a successful response to the Originator |
| Information in Response message | All parameters defined in table 8.1.3-1 in [1] apply with the specific details for:<br>Content: address of the created <subscription> resource, according to clause 10.1.1.1 in [1] |
| Processing at Originator after receiving Response | According to clause 10.1.1.1 in [1] |
| Exceptions | According to clause 10.1.1.1 in [1] |

After the Hosting CSE receives a <subscription> creation, it performs time window mechanism as described herein to determine if a notification needs to be issued. Only when expected changes on the target resources occur within a time window, the Hosting CSE issues a notification to the Originator or its designated notification receivers.

Figure 19:
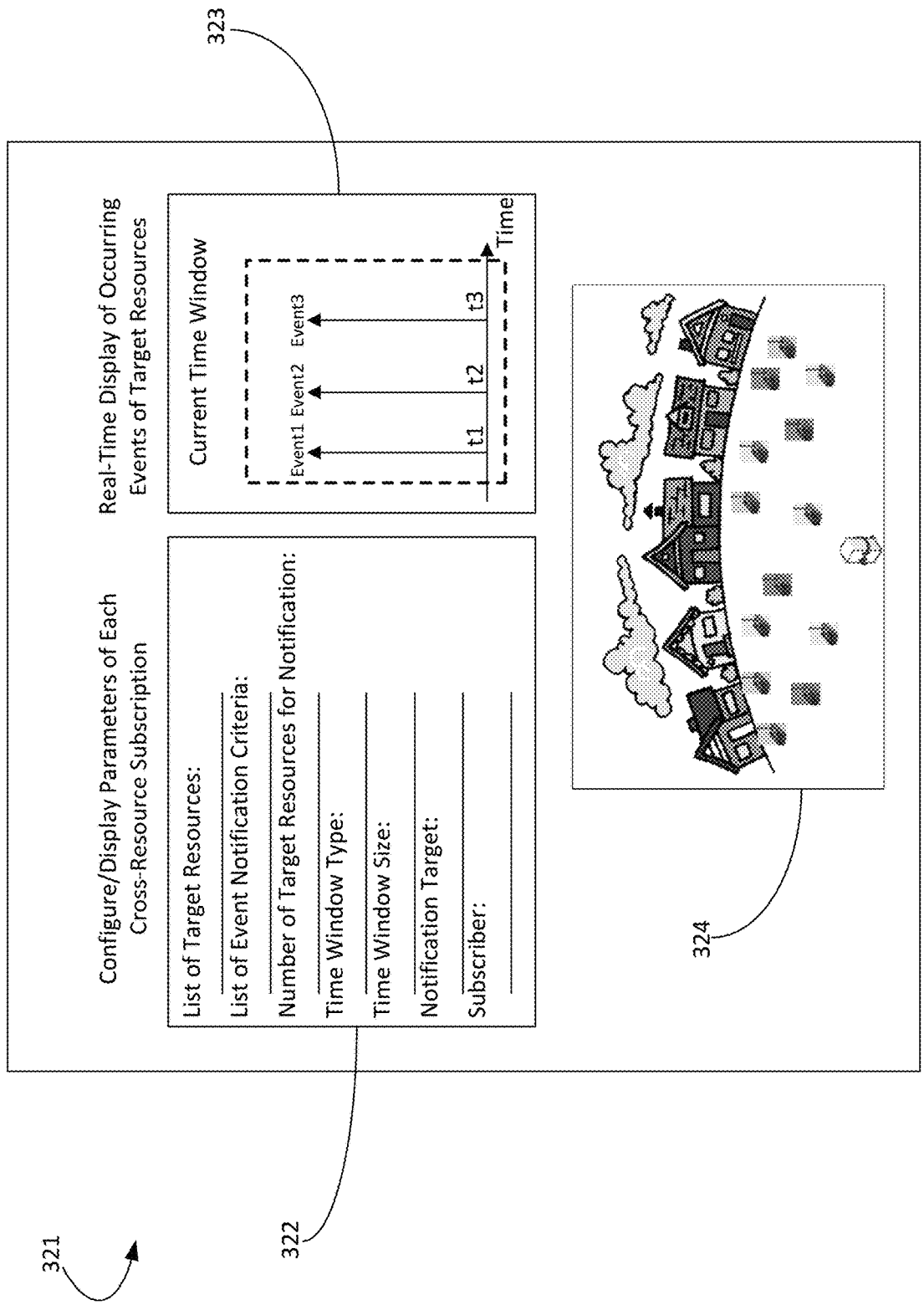
FIG. 19 illustrates an exemplary user interface for a resource host (e.g., an oneM2M CSE)

A user interface may interact with a subscriber (e.g., an AE) to configure or display parameters of a cross-resource subscription, such as List of Target Resources, List of Event Notification Criteria, and Time Window Size (see FIG. 18). FIG. 19 illustrates an exemplary display (e.g., graphical user interface) that may be generated based on the methods and systems discussed herein. With reference to FIG. 19, for a resource host, user interface 321 may display, in addition to cross-resource subscription parameters of block 322, the occurring events of target resources information 323 (e.g., in approximately real time). Display interface 321 (e.g., touch screen display) may provide other text in block 322 associated with cross-resource subscription, such as the parameters of Table 1 through Table 7. In another example, progress of any of the steps (e.g., sent messages or success of steps of FIG. 7-FIG. 12) discussed herein may be displayed by display 321. In addition, graphical output 324 may be displayed on display interface 321. Graphical output 324 may be the topology of the devices, a graphical output of the progress of any method or systems discussed herein, or the like.

FIG. 20A is a diagram of an example machine-to machine (M2M), Internet of Things (IoT), or Web of Things (WoT) communication system 10 in which one or more disclosed concepts associated with cross-resource subscription may be implemented (e.g., FIG. 7-FIG. 19 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 20A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 20B, the illustrated M2M service layer 22 (e.g., hosting CSE 294 as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 20B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using method associated with cross-resource subscription, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The systems associated with cross-resource subscription of the present application may be implemented as part of a service layer. The service layer (e.g., hosting CSE 294) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the method associated with cross-resource subscription of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g., infrastructure node, middle node, application-specific node). Further, the systems associated with cross-resource subscription of the present application can be implemented as part of an M2M network that uses a Service Oriented Architecture (SOA) or a resource-oriented architecture (ROA) to access services such as the systems associated with cross-resource subscription of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

FIG. 20C is a system diagram of an example M2M device 30, such as an M2M terminal device 18 or an M2M gateway device 14 for example. As shown in FIG. 20C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., M2M entity 161, M2M entity 160, M2M entity 163, M2M entity 162, hosting CSE 294, AE 296, MN-CSE 305, and others) may be an exemplary implementation that performs the disclosed systems and methods for cross-resource subscription.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 20C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 20C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the cross-resource subscription in some of the examples described herein are successful or unsuccessful (e.g., subscription setup, notifications received, updated time window, etc.), or otherwise indicate a status of cross-resource subscription and associated components. The control lighting patterns, images, or colors on the display or indicators 42 may be reflective of the status of any of the method flows or components in the FIG.'s illustrated or discussed herein (e.g., FIG. 7-FIG. 19, etc.). Disclosed herein are messages and procedures of cross-resource subscription. The messages and procedures can be extended to provide interface/API for users to request related resources via an input source (e.g., speaker/microphone 38, keypad 40, or display/touchpad 42) and request, configure, or query cross-resource subscription information of resources, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

FIG. 20D is a block diagram of an exemplary computing system 90 on which, for example, the M2M service platform 22 of FIG. 20A and FIG. 20B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for cross-resource subscription, such as generating a notification based on meeting one or more criterion associated with multiple target resources.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 20A and FIG. 20B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. As evident from the herein description, storage media should be construed to be statutory subject matter under United States Code, Title 35, Section 101 (35 U.S.C. § 101). Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure—systems and methods for cross-resource subscription—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device,"

"network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for cross-resource subscription. A method, system, computer readable storage medium, or apparatus has means for receiving a message for a cross-resource subscription, wherein the message is indicative of a request, by a remote device, for a subscription to be notified of a change of a plurality of target resources that meet a criteria within a window of time; determining that the remote device is approved for the cross-resource subscription; and generating a local subscription resource to maintain the cross-resource subscription. The method, system, computer readable storage medium, or apparatus has means for sending a response message that comprises an indication of approval of cross-resource subscription. The method, system, computer readable storage medium, or apparatus has means for requesting a subscription to a first resource of the plurality of target resources, wherein the request comprises a criterion of the criteria. The method, system, computer readable storage medium, or apparatus has means for receiving a notification that the criterion of the criteria was met; determining that the criteria is met based on receiving the notification; and notifying the remote device based on the determining that the criteria is met. The method, system, computer readable storage medium, or apparatus has means for publishing an indication of the information of the local subscription resource to a display. The method, system, computer readable storage medium, or apparatus has means for publishing parameters of the message for cross-resource subscription to a display. The method, system, computer readable storage medium, or apparatus has means for publishing, to a display, events that meet criteria within a graphical representation of the window of time. The apparatus may include a common service entity. A resource of the target resources may be located on the remote device. The message may include an indication of a type of the window of time, wherein the type of wind of time comprises a serial time window. The message may include an indication of a type of the window of time. The message may include a number of the target resources in which a notification is expected to be received when the criteria are met. The message may include a list of event notification criteria for the plurality of target resources. All combinations in this paragraph (including the removal or addition of steps) are contemplated in a manner that is consistent with the other portions of the detailed description.

What is claimed:

1. An apparatus comprising circuitry configured to:
receive a message for a cross-resource subscription, wherein the message is indicative of a request, by a subscriber entity, for a subscription,
wherein the subscription is for a remote device to be notified of a change of a plurality of target resources;
based on the message, determine that the subscriber entity has privilege to create the cross-resource subscription;
based on having the privilege to create the cross-resource subscription, generate a local subscription resource for the cross-resource subscription; and
send, to the subscriber entity, a response message comprising an identifier of the local subscription resource, wherein the subscriber entity is configured to manage the cross-resource subscription for the plurality of target resources based on the identifier of the local subscription resource.

2. The apparatus of claim 1, wherein the message comprises a list of event notification criteria for the plurality of target resources.

3. The apparatus of claim 1, wherein the message comprises a number of the plurality of target resources in which a notification is expected to be received when a criteria within a window of time are met.

4. The apparatus of claim 3, wherein the message comprises an indication of a type of the window of time.

5. The apparatus of claim 3, wherein the message comprises an indication of a type of the window of time, wherein the type of window of time comprises a sliding time window.

6. The apparatus of claim 3, the circuitry further configured to:
provide a second request for a subscription to a first resource of the plurality of target resources, wherein the second request comprises a criterion of the criteria;
receive a notification that the criterion of the criteria was met;
determine that the criteria is met based on receiving the notification; and
notify the subscriber entity based on the determining that the criteria is met.

7. The apparatus of claim 1, the circuitry further configured to provide instructions to send a response message that comprises an indication of approval of cross-resource subscription.

8. The apparatus of claim 1, wherein at least one resource of the target resources is located on the subscriber entity.

9. The apparatus of claim 1, wherein the apparatus comprises a common service entity.

10. An apparatus comprising circuitry configured to:
transmit a message for a cross-resource subscription,
wherein the message is indicative of a request for a subscription,
wherein the subscription is for the apparatus to be notified of a change of a plurality of target resources; and
receive a response message that comprises an indication of approval of cross-resource subscription,
wherein the response message is sent after generating a local subscription resource for the cross-resource subscription based on determining that the apparatus has privilege to create the cross-resource subscription, and
wherein the response message comprising an identifier of the local subscription resource for managing the cross-resource subscription for the plurality of target resources.

11. A method for a service providing a plurality of applications with service capabilities through a set of Application Programming Interfaces (APIs), the method comprising:

receiving a message for a cross-resource subscription,
wherein the message is indicative of a request, by a subscriber entity, for a subscription,
wherein the subscription is for the subscriber entity to be notified of a change of a plurality of target resources;
based on the message, determining that the subscriber entity has privilege to create the cross-resource subscription;
based on having the privilege to create the cross-resource subscription, generating a local subscription resource for the cross-resource subscription; and
sending, to the subscriber entity, a response message comprising an identifier of the local subscription resource, wherein the subscriber entity is configured to manage the cross-resource subscription for the plurality of target resources based on the identifier of the local subscription resource.

12. The method of claim 11, further comprising publishing an indication of information of the local subscription resource to a display.

13. The method of claim 11, further comprising publishing parameters of the message for cross-resource subscription to a display.

14. The method of claim 11, further comprising publishing, to a display, events that meet criteria within a graphical representation of a window of time.

15. The method of claim 14, wherein the message comprises list of event notification criteria for the plurality of target resources.

16. The method of claim 14, wherein the message comprises a number of the plurality of target resources in which notifications is expected to be received when the criteria are met.

17. The method of claim 14, wherein the message comprises an indication of a type of the window of time.

18. The method of claim 14, further comprising providing a second request for a subscription to a first resource of the plurality of target resources, wherein the second request comprises a criterion of the criteria.

19. The method of claim 11, further comprising providing instructions to send a response message that comprises an indication of approval of cross-resource subscription.

20. The method of claim 11, wherein at least one resource of the target resources is located on the subscriber entity.

* * * * *